United States Patent
James

(10) Patent No.: US 12,484,575 B2
(45) Date of Patent: Dec. 2, 2025

(54) MOSQUITO EGG CRYOPRESERVATION

(71) Applicant: Sanaria Inc., Rockville, MD (US)

(72) Inventor: Eric R. James, Darnestown, MS (US)

(73) Assignee: Sanaria Inc., Rockville, MD (US)

( * ) Notice: Subject to any disclaimer, the term of this patent is extended or adjusted under 35 U.S.C. 154(b) by 973 days.

(21) Appl. No.: 17/626,381

(22) PCT Filed: Jul. 13, 2020

(86) PCT No.: PCT/US2020/041854
§ 371 (c)(1),
(2) Date: Jan. 11, 2022

(87) PCT Pub. No.: WO2021/011503
PCT Pub. Date: Jan. 21, 2021

(65) Prior Publication Data
US 2022/0248663 A1    Aug. 11, 2022

Related U.S. Application Data

(60) Provisional application No. 62/873,780, filed on Jul. 12, 2019.

(51) Int. Cl.
| | | |
|---|---|---|
| *A01N 1/125* | (2025.01) | |
| *A01K 67/68* | (2025.01) | |
| *A01N 1/162* | (2025.01) | |
| *A61K 39/00* | (2006.01) | |

(52) U.S. Cl.
CPC .............. *A01N 1/125* (2025.01); *A01K 67/68* (2025.01); *A01N 1/162* (2025.01); *A01K 2207/12* (2013.01); *A01K 2227/706* (2013.01); *A61K 39/00* (2013.01)

(58) Field of Classification Search
None
See application file for complete search history.

(56) References Cited

PUBLICATIONS

Abidalla, "Development of cryopreservation technology of Lepidoptera: Study of Embryonic Development and survival after treating wit" University of Bacillicata (Year: 2010).*
Abidalla, M., "Development of Cryoconservation Technology of Lepidoptera: Study of Embryonic Development and Survival After Treating With Cryoprotective Agents," Final dissertation for the achievement of the degree of Doctor (Ph. D.) in Biology and Biotechnology at Universit Degli Studi Della Basilicata Scuola Di Dottorato Di Ricerca, 186 pages (2010).
Anderson, S.A. et al., "In Vitro Culture and Cryopreservation of Uronema Marinum Isolated From Farmed New Zealand Groper (*Polyprion oxygeneios*)," *Journal of Microbiological Methods* 79(1):62-66, Elsevier Biomedical, Netherlands (2009).
Bale, J.S., "Insects and Low Temperatures: From Molecular Biology to Distributions and Abundance," *Philosophical Transactions of the Royal Society of London*. Series B 357(1423):849-862, Royal Society, England (2002).
Briegel, H., "Metabolic Relationship Between Female Body Size, Reserves, and Fecundity of Aedes Aegypti," *Journal of Insect Physiology* 36(3):165-172, Pergamon Press plc, United Kingdom (1990).
Charlwood, J.D., et al., "Dry Season Refugia of Malaria-transmitting Mosquitoes in a Dry Savannah Zone of East Africa," *The American Journal of Tropical Medicine and Hygiene* 62(6):726-732, American Society of Tropical Medicine and Hygiene, United States (2000).
Christensen, B.M., et al., "Melanization Immune Responses in Mosquito Vectors," *Trends in Parasitology* 21(4):192-199, Elsevier Science, England (2005).
Church, L.W., et al., "Clinical Manifestations of Plasmodium Falciparum Malaria Experimentally Induced by Mosquito Challenge," *The Journal of Infectious Diseases* 175(4):915-920, Oxford University Press, United States (1997).
Epstein, J.E., et al., "Safety and Clinical Outcome of Experimental Challenge of Human Volunteers With *Plasmodium falciparum*—Infected Mosquitoes: An Update," *The Journal of Infectious Diseases* 196(1):145-154, Oxford University Press, United States (2007).
Evans, R., et al., "Quantitative Interpretation of Diffusion-ordered Nmr Spectra: Can We Rationalise Small Molecule Diffusion Coefficients?," *Angewandte Chemie (International Edition)* 52(11):3199-3202, Wiley-VCH, Germany (2013).
Farnesi, L.C., et al., "Physical Features and Chitin Content of Eggs From the Mosquito Vectors Aedes Aegypti, Anopheles Aquasalis and Culex Quinquefasciatus: Connection With Distinct Levels of Resistance to Desiccation," *Journal of Insect Physiology* 83:43-52, Elsevier, England (2015).
Feldmann, A.M. and Ponnudurai, T., "Selection of Anopheles Stephensi for Refractoriness and Susceptibility to Plasmodium Falciparum," *Medical and Veterinary Entomology* 3(1):41-52, Published for the Royal Entomological Society of London by Blackwell Scientific Publications, England (1989).
Goltsev, Y., et al., "Developmental and Evolutionary Basis for Drought Tolerance of the Anopheles Gambiae Embryo," *Developmental Biology* 330(2):462-470, Elsevier, United States (2009).
Hoffman, S.L., et al., "Development of a Metabolically Active, Non-Replicating Sporozoite Vaccine to Prevent Plasmodium Falciparum Malaria," *Human Vaccines* 6(1):97-106, Landes Bioscience, United States (2010).
Hoffman, S.L., et al., "Protection of Humans Against Malaria by Immunization with Radiation-attenuated Plasmodium Falciparum Sporozoites," *The Journal of Infectious Diseases* 185(8):1155-1164, Oxford University Press, United States (2002).

(Continued)

*Primary Examiner* — Robert M Kelly
*Assistant Examiner* — John David Moore
(74) *Attorney, Agent, or Firm* — Sterne, Kessler, Goldstein & Fox P.L.L.C.

(57) ABSTRACT

Herein is described a method devised to cryopreserve mosquito eggs, viable upon subsequent thawing. The method reproducibly yields >25% hatched first instar larvae of *Anopheles*-species mosquitoes from cryopreserved eggs. The majority of hatched larvae continue to develop normally (87% pupation), through to adults (98%, 50% of which are female) which subsequently blood feed and produce viable second generation embryos that also develop normally. Adult mosquitoes obtained from cryopreserved embryos are able to be infected with *Plasmodium falciparum* gametocytes and produce salivary gland sporozoites in similar numbers to control mosquitoes.

23 Claims, 8 Drawing Sheets

(56) References Cited

PUBLICATIONS

James, E.R., "Cryopreservation of Schistosoma Mansoni Schistosomula Using 40% v/v (10M) Methanol and Rapid Cooling," *Cryo-Letters* 1:535-544, (1980).

James, E.R., "Parasite Cryopreservation by Vitrification," *Cryobiology* 49(3):201-210, Elsevier, Netherlands (2004).

James, E.R. and Farrant, J., "Recovery of Infective Schistosoma Mansoni Schistosomula From Liquid Nitrogen: A Step Towards Storage of a Live Schistosomiasis Vaccine," *Transactions of the Royal Society of Tropical Medicine and Hygiene* 71(6):498-500, Oxford University Press, England (1977).

Juliano, S.A., et al., "Desiccation and Thermal Tolerance of Eggs and the Coexistence of Competing Mosquitoes," *Oecologia* 130(3):458-469, Springer, Germany (2002).

Kandul, N.P., et al., "Transforming Insect Population Control With Precision Guided Sterile Males With Demonstration in Flies," *Nature Communications* 10(1):84, Nature Pub. Group, England (Jan. 2019).

Liu, X.H. and Mazur, P., "Effects of Sugars on the Kinetics of Drying and on the Survival of Partially Dehydrated Larvae of Anopheles Mosquitoes," *Journal of Insect Physiology* 49(7):685-695, Elsevier, England (2003).

Liu, X.H., et al., "Permeation and Toxicity of Ethylene Glycol and Methanol in Larvae of Anopheles Gambiae," *The Journal of Experimental Biology* 206:2221-2228, Company Of Biologists Limited, England (2003).

Mazur, P., et al., "Cryobiological Preservation of *Drosophila* Embryos," *Science* 258(5090):1932-1935, American Association for the Advancement of Science, United States (1992).

Minakawa, N., et al., "Anopheline Mosquito Survival Strategies During the Dry Period in Western Kenya," *Journal of Medical Entomology* 38(3):388-392, Oxford University Press, England (2001).

Monnerat, A.T., et al., "Anopheles Albitarsis Embryogenesis: Morphological Identification of Major Events," *Memórias Do Instituto Oswaldo Cruz* 97(4):589-596, Instituto Oswaldo Cruz, Brazil (2002).

Nash, A., et al., "Integral Gene Drives for Population Replacement," *Biology Open* 8(1):bio037762, Company of Biologists Ltd, England (Jan. 2019).

Rall, W.F. and Wood, M.J., "High in Vitro and in Vivo Survival of Day 3 Mouse Embryos Vitrified or Frozen in a Non-toxic Solution of Glycerol and Albumin," *Journal of Reproduction and Fertility* 101(3):681-688, Portland Press, England (1994).

Rezende, G.L., et al., "Embryonic Desiccation Resistance in *Aedes Aegypti*: Presumptive Role of the Chitinized Serosal Cuticle," *BMC Developmental Biology* 8(1):82, pp. 1-14, BioMed Central Ltd., United Kingdom (2008).

Rinehart, J.P., et al., "Enhanced Cold and Desiccation Tolerance in Diapausing Adults of Culex *Pipiens*, and a Role for Hsp70 in Response to Cold Shock but Not as a Component of the Diapause Program," *Journal of Medical Entomology* 43(4):713-722, Oxford University Press, England (2006).

Schreuders, P.D., et al., "Characterization of Intraembryonic Freezing in Anopheles Gambiae Embryos," Cryobiology 33(5):487-501, Elsevier, Netherlands (1996).

Seki, S. and Mazur, P., "The Dominance of Warming Rate Over Cooling Rate in the Survival of Mouse Oocytes Subjected to a Vitrification Procedure," Author Manuscript, *Cryobiology* 59(1):75-82, Elsevier, Netherlands (2009).

Shililu, J.I., et al., "Development and Survival of *Anopheles Gambiae* Eggs in Drying Soil: Influence of the Rate of Drying, Egg Age, and Soil Type," *Journal of the American Mosquito Control Association* 20(3):243-247, American Mosquito Control Association, United States (2004).

Smith, B.S., et al., "Cryopreservation of the Entomogenous Nematode Parasite Steinernema Feltiae (= *Neoaplectana carpocapsae*)," Cryobiology 27:319-327, Academic Press, Inc., United States (1990).

Steponkus, P.L., et al., "Cryopreservation of *Drosophila melanogaster* Embryos," *Nature* 345(6271):170-172, Nature Publishing Group, England (1990).

Valencia, M.P., et al., "Permeability of Intact and Dechorionated Eggs of the *Anopheles* Mosquito to Water Vapor and Liquid Water: A Comparison With *Drosophila*," *Cryobiology* 33(1):142-148, Elsevier, Netherlands (1996).

Valencia, M.P., et al., "Permeabilization of Eggs of the Malaria Mosquito Anopheles Gambiae," *Cryobiology* 33(1):149-162, Elsevier, Netherlands (1996).

Vargas, H.C.M., et al., "Serosal Cuticle Formation and Distinct Degrees of Desiccation Resistance In Embryos of The Mosquito Vectors Aedes Aegypti, Anopheles Aquasalis and Culex Quinquefasciatus," *J. Insect Physiol.*, 62:54-60, Elsevier, Netherlands (2014).

Wood, M.J., et al., "Effect of Slow and Ultra-rapid Freezing on Cell Surface Antigens of 8-cell Mouse Embryos," *The Journal of Experimental Zoology* 262(3):330-339, Wiley-Liss, United States (1992).

International Search Report dated Nov. 13, 2020, for International Application No. PCT/US2020/041854, 4 pages.

\* cited by examiner

MOSQUITO EGG CRYOPRESERVATION

CROSS-REFERENCE TO RELATED APPLICATIONS

The present application is a U.S. national stage application of international application PCT/US2020/041854, filed Jul. 13, 2020, which claims the priority benefit of U.S. Provisional Appl. No. 62/873,780, filed Jul. 12, 2019, each of which is hereby incorporated by reference in its entirety.

STATEMENT OF GOVERNMENT SUPPORT

The invention was made with government support under Grant No. 1R43AI098884 awarded by the National Institute of Health (NIH). The government has certain rights in the invention.

FIELD OF THE APPLICATION

This invention generally relates to cryopreservation of animal species. More specifically, it relates to cryopreservation of mosquitoes and the cryopreservation of viable mosquito eggs.

BACKGROUND

The interest in and the need for cryopreservation of mosquitoes is driven in large part by the importance of *Anopheles*-species mosquitoes as vectors of malaria and several other medically-significant infectious diseases. Many labs worldwide conduct research on anopheline mosquitoes: 1) to better understand their biology; 2) to generate new strains refractory to infection by pathogens, particularly those causing malaria; 3) as a necessary component in maintaining the life cycle of malaria; and 4) to generate genetically modified lines for anopheline population control and control of the diseases they transmit. The main impetus for the instant invention was to develop a stable repository of *Anopheles* (*An.*) *stephensi* in support of the development of a live vaccine against malaria.

Malaria is responsible for >235 million cases and close to 0.5 million deaths per year. A highly effective vaccine that prevents blood stage infection of *Plasmodium* parasites and thereby all disease and transmission would be ideal for eliminating malaria. For example, attenuated *Plasmodium falciparum* (Pf) sporozoites (SPZ) administered by infected mosquito bite, provide protection against Pf challenge for least 10 months in >90% of human volunteers (Hoffman et al. 2002).

Sanaria® PfSPZ Vaccine, comprising attenuated PfSPZ has been developed and is in clinical trials (Hoffman et al. 2010). The present manufacturing process for the vaccine utilizes a master cell bank of cryopreserved Pf-infected erythrocytes as a source of parasites. *An. stephensi* mosquitoes, maintained in an insectary, are utilized for infection by the parasites, which subsequently develop to SPZ stage. Pf SPZ are then attenuated and purified from the salivary glands of infected mosquitoes for use as the immunogen in PfSPZ Vaccine.

To date there has been no method for cryopreserving any of the *Anopheles* life cycle stages, consequently mosquitoes must be maintained as continuous colonies.

The SDA500 strain of *An. stephensi* originated at the Research Institute ITAL (Instituut voor Toepassing van Atoomenergie in de Landbouw/Institute for Nuclear Applications in Agriculture) from a selection program to obtain mosquitoes highly susceptible to infection by Pf oocysts (Feldmann and Ponnudurai, 1989): the genetic and physiological bases for strain susceptibility remain unclear. This strain was donated for use by Dr. Beaudoin to The Biomedical Research Institute (Rockville, MD) and the Naval Medical Research Institute (now NMRC) from a strain established at the Catholic University of Nijmegen (The Netherlands) from the original isolate. At various stages of its history, the SDA500 strain has been used to produce mosquitoes for multiple Pf challenge studies (Church et al, 1997; Epstein et al, 2007) and is used widely within the mosquito-malaria community as a robust model for transmission of human, primate and rodent malaria species. The SDA500 strain provides reproducibly high prevalence and intensity of Pf infections resulting in substantial numbers of SPZ. Experience with other strains of *An. stephensi* indicates that not all strains are equally adaptable to conditions as required for the production of Pf SPZ under current good manufacturing practices (cGMP). There has been no means to maintain the genetic integrity of this or any other strain or species of *Anopheles* mosquito. This deficiency represents an important risk to any PfSPZ manufacturing process; i.e. genetic drift in the SDA500 colony could cause reductions in mosquito production or PfSPZ infections.

The maintenance of *Anopheles* strains world-wide has been accomplished through careful husbandry, monitoring of the strain characteristics and periodic reselection. This requires considerable manpower and resource commitments, painstaking studies on infection and mosquito growth characteristics, and cannot eliminate the risk of changes in strain characteristics.

The inability to maintain *Anopheles* species mosquitoes in anything other than continuous culture is considered one of the most serious drawbacks to the huge international effort to develop and release either transgenic or paratransgenic mosquitoes for malaria control or sterile insects for mosquito population control (Kandul et al., 2019; Nash et al., 2019)). Such approaches will require the rearing of anophelines in numbers that are far beyond the capacity of any current insect rearing facility anywhere in the world.

BRIEF SUMMARY

Disclosed herein are methods for the cryopreservation of anopheline eggs, their storage in cryogenic freezers, including liquid nitrogen vapor phase (LNVP) at temperatures below −150° C., such that, upon subsequent thawing and warming to ambient temperature, a substantial proportion, e.g., at least 5%, of the cryopreserved eggs is able to hatch.

In some aspects, the method comprises a first incubation in which the anopheline eggs are incubated in a cryoprotectant additive (CPA) (e.g., a solution comprising methanol) at a first incubation temperature for a first incubation time. In certain aspects, the CPA comprises at least 50%, e.g., at least 95%, at least 96%, at least 97%, at least 98%, at least 99%, or 100% v/v methanol. In certain aspects, the methanol solution is 99.9% to 100% v/v methanol. In some aspects, the CPA is methanol solution comprising 99.95% to 100% v/v methanol.

In some aspects, the first incubation temperature is less than 0° C. In certain aspects, the first incubation temperature is less than −1° C., less than −2° C., less than −3° C., less than −4° C., less than −5° C., less than −6° C., less than −7° C., less than −8° C., less than −9° C., less than −10° C., less than −11° C., less than −12° C., less than −13° C., less than −14° C., less than −15° C., or less than −20° C. In some aspects, the first incubation temperature is between 0° C. and −20° C., e.g., between −5° C. and −15° C., between 0° C. and −15° C., between 0° C. and −18° C., or between −5° C. and −11° C.

In some aspects, the first incubation time in which the anopheline eggs are incubated in the CPA (e.g., solution comprising methanol) during the first incubation is between 0 to 60 minutes or 0 minutes to 20 minutes. In certain aspects, the first incubation time is at least 1 minute, at least 2 minutes, at least 3 minutes, at least 4 minutes, at least 5 minutes, at least 6 minutes, at least 7 minutes, at least 8 minutes, at least 9 minutes, at least 10 minutes, at least 11 minutes, at least 12 minutes, at least 13 minutes, at least 14 minutes, at least 15 minutes, at least 16 minutes, at least 17 minutes, at least 18 minutes, at least 19 minutes, at least 20 minutes, at least 30 minutes, at least 40 minutes, at least 50 minutes, or at least 60 minutes. In some aspects, the first incubation time is between 1 minute and 60 minutes or between 5 minutes and 8 minutes. In some aspects, the first incubation time is between 0 and 15 minutes. In some aspects, the first incubation time is between 6 minutes and 15 minutes.

In some aspects, a method for the cryopreservation of viable anopheline eggs comprises a first incubation, wherein the first incubation comprises incubating the anopheline eggs in CPA (e.g., a 99.9% to 100% v/v methanol solution) at a temperature between 0° C. and −15° C., between 0° C. and −18° C., between −5° C. and −10° C., or between −5° C. and −11° C. (i.e., first incubation temperature) for between 1 minute to 60 minutes, between 0 minutes and 15 minutes, between 5 minutes and 30 minutes, or between 6 minutes and 8 minutes (i.e., first incubation time). In some aspects, the first incubation comprises incubating the anopheline eggs in the CPA (e.g., a solution comprising methanol) at a temperature of between −5° C. and −10° C. (i.e., first incubation time) for between 6 minutes and 7 minutes, between 6 minutes and 8 minutes, between 5 minutes and 30 minutes, or between 0 minute and 20 minutes (i.e., a first incubation time).

In some aspects, a method for the cryopreservation of viable anopheline eggs disclosed herein further comprises a second incubation. In certain aspects, the second incubation comprises further incubating the anopheline eggs in the CPA at a second incubation temperature for a second incubation time.

For instance, in some aspects, the method for the cryopreservation of viable anopheline eggs disclosed herein comprises a first incubation and a second incubation, wherein the first incubation is performed in a first incubator and the second incubation is performed in a second incubator. In some of these aspects, the first incubation comprises incubating the anopheline eggs in the CPA in a container at a first incubation temperature for a first incubation time, and the second incubation comprises transferring the container to the second incubator, and further incubating at a second incubation temperature for a second incubation time.

In some aspects, the second incubation temperature is less than 0° C. In certain aspects, the second incubation temperature in which the anopheline eggs are incubated in the methanol solution is less than −1° C., less than −2° C., less than −3° C., less than −4° C., less than −5° C., less than −6° C., less than −7° C., less than −8° C., less than −9° C., less than −10° C., less than −11° C., less than −12° C., less than −13° C., less than −14° C., less than −15° C., or less than −20° C. In some aspects, the second incubation temperature is between −10° C. and −15° C. In some aspects, the second incubation temperature is between −5° C. and −20° C., between −7° C. and −20° C., between −10° C. and −15° C., between −5° C. and −18° C., or between −14° C. and −16° C. In certain aspects, the second incubation temperature is about −14° C.

In some aspects, the second incubation time in which the anopheline eggs are incubated is between 0 minutes and 120 minutes (e.g., about less than 1 minute and at least 120 minutes). In certain aspects, the second incubation time is at least 1 minute, at least 2 minutes, at least 3 minutes, at least 4 minutes, at least 5 minutes, at least 6 minutes, at least 7 minutes, at least 8 minutes, at least 9 minutes, at least 10 minutes, at least 11 minutes, at least 12 minutes, at least 13 minutes, at least 14 minutes, at least 15 minutes, at least 16 minutes, at least 17 minutes, at least 18 minutes, at least 19 minutes, at least 20 minutes, at least 25 minutes, at least 30 minutes, at least 35 minutes, at least 40 minutes, at least 45 minutes, at least 50 minutes, at least 55 minutes, at least 60 minutes, at least 70 minutes, at least 80 minutes, at least 90 minutes, at least 100 minutes, at least 110 minutes, or at least 120 minutes. In certain aspects, the second incubation time is between 5 minutes and 30 minutes. In certain aspects, the second incubation time is between 10 minutes and 30 minutes, between 5 minutes and 30 minutes, between 14 minutes and 15 minutes, between 14 minutes and 16 minutes, between 10 minutes and 30 minutes, or between 14 minutes and 20 minutes.

In some aspects, the second incubation of a method for the cryopreservation of viable anopheline eggs disclosed herein comprises incubating the anopheline eggs in the CPA (e.g., a solution comprising methanol) at a temperature of between −10° C. and −15° C., between −5° C. and −18° C., or between −5° C. and −20° C. (i.e., second incubation temperature) for between 5 minutes and 30 minutes, between less than 1 minute and 120 minutes, or between 10 minutes and 20 minutes (i.e., second incubation time). In some aspects, the second incubation comprises incubating the anopheline eggs in the CPA (e.g., solution comprising methanol) at a temperature of −14° C. (i.e., second incubation temperature) for between 5 minutes and 60 minutes, between 14 minutes and 16 minutes, or between 14 minutes and 15 minutes (i.e., second incubation time).

In some aspects, the first incubation occurs in an incubator (e.g., first incubator). In some aspects, the second incubation occurs in an incubator (e.g., second incubator). In some aspects, an incubator (e.g., that can be used for the first incubation, second incubation, or both) comprises a cooling block.

In some aspects, a method for the cryopreservation of viable anopheline eggs disclosed herein additionally comprises a first transfer in which the anopheline eggs (e.g., from the first incubation, the second incubation, or both) are transferred to liquid nitrogen. In certain aspects, the method further comprises a second transfer. In some aspects, the second transfer comprises transferring the anopheline eggs (e.g., from the first transfer) to cryogenic storage in a freezer, including a vapor phase liquid nitrogen freezer. In some aspects, the second transfer comprises transferring the anopheline eggs to storage in a mechanical freezer on into liquid nitrogen vapor phase. In certain aspects, the second transfer comprises transferring the anopheline eggs (e.g., from the first transfer) to a refrigerated storage. In some aspects, the refrigerated storage is at a temperature of −100° C. or less, −110° C. or less, −120° C. or less, −130° C. or less, −140° C. or less, −150° C. or less, −160° C. or less, −170° C. or less, −180° C. or less, −190° C. or less, or −200° C. or less. In certain aspects, the refrigerated storage is at a temperature of −150° C. or less or −135° C. or less.

In some aspects, a method for the cryopreservation of viable anopheline eggs disclosed herein comprises: (a) a first incubation in which the anopheline eggs are incubated in a composition comprising a CPA (e.g., a 99.9% to 100% v/v methanol solution) at a temperature of between 0° C. and −15° C. for between 1-60 minutes; (b) a second incubation in which the anopheline eggs are incubated in the composition comprising the CPA (e.g., methanol solution) at a temperature of between −5° C. and −20° C. (e.g., between −7° C. and −20° C.) for between 5 minutes and 30 minutes; (c) a first transfer in which the anopheline eggs are transferred to liquid nitrogen; and (d) a second transfer in which the anopheline eggs are transferred to a refrigerated storage at a temperature equal to or less than −135° C.

In some aspects, a method for the cryopreservation of viable anopheline eggs disclosed herein comprises: (a) first incubation in which the anopheline eggs are incubated in a composition comprising a CPA (e.g., a 99.9% to 100% v/v methanol solution) at a temperature of between 0° C. and −18° C. for between 0 minute and 15 minutes or between 0 minutes and 30 minutes; (b) a second incubation in which the anopheline eggs are incubated in the composition comprising the CPA (e.g., methanol solution) at a temperature of between −5° C. and −18° C. for between less than 1 minute and 120 minutes; (c) a first transfer in which the anopheline eggs are transferred into liquid nitrogen; and (d) a second transfer in which the anopheline eggs are transferred to vapor phase liquid nitrogen.

As described herein, in some aspects, the survival of anopheline eggs cryopreserved using the methods disclosed herein can decrease with the age of the eggs (see, e.g., FIGS. 1 and 3). Accordingly, in certain aspects, the anopheline eggs that are cryopreserved using the methods described herein are harvested soon after post-oviposition. In some aspects, the anopheline eggs are harvested 1 minute, 5 minutes, 10 minutes, 15 minutes, 20 minutes, 25 minutes, 30 minutes, 35 minutes, 40 minutes, 45 minutes, 50 minutes, 55 minutes, 60 minutes, 70 minutes, 80 minutes, 90 minutes, 100 minutes, 110 minutes, or 120 minutes post-oviposition. In certain aspects, the anopheline eggs are harvested at between 15 minutes and 30 minutes post-oviposition. In some aspects, the anopheline eggs are harvested at between 5 minutes and 60 minutes post-oviposition, e.g., between 5 minutes and 45 minutes post-oviposition or between 15 minutes and 30 minutes post-oviposition.

In some aspects, the method for the cryopreservation of a viable anopheline egg disclosed herein further comprises warming the anopheline eggs after the second transfer in which the anopheline eggs are transferred to refrigerated storage. In certain aspects, subsequent to the refrigerated storage, the anopheline egg is warmed, e.g., to ambient temperature, at a rate of at least 1,000° C./min and diluted with a CPA at a dilution of at least 1:10.

In some aspects, during the subsequent warming step, the cryopreserved anopheline egg is warmed at a rate of at least 1,000° C./min, at least 2,000° C./min, at least 3,000° C./min, at least 4,000° C./min, at least 5,000° C./min, 6,000° C./min, at least 7,000° C./min, at least 8,000° C./min, at least 9,000° C./min, at least 10,000° C./min, at least 15,000° C./min, at least 20,000° C./min, at least 25,000° C./min, at least 30,000° C./min, at least 60,000° C./min or more. In some aspects, the cryopreserved anopheline eggs are warmed at a rate of between 1,000° C./min and 60,000° C./min (e.g., between 5,000° C./min and 30,000° C./min). In some aspects, the warming step comprises diluting the anopheline eggs with the CPA at a dilution of at least 1:5, at least 1:10, at least 1:50, at least 1:100, at least 1:200, at least 1:300, at least 1:400, at least 1:500, at least 1:600, at least 1:700, at least 1:800, at least 1:900, at least 1:1000 or more. In some aspects, the anopheline eggs are diluted with the CPA at a dilution of between 1:10 and 1:500.

As described herein, upon warming, e.g., to ambient temperature, the cryopreserved anopheline eggs of the present disclosure remain viable and hatch to release viable stage 1 instar larvae. In some aspects, with the methods disclosed herein, at least 5% of the cryopreserved anopheline eggs hatch to release viable stage 1 instar larvae after the subsequent warming step and period of incubation at ambient temperature. In certain aspects, the warming step described herein further comprises diluting the anopheline eggs in CPA (e.g., at a dilution of at least 1:100 or at least 1:10). In some aspects, the cryopreserved anopheline eggs hatch to release viable stage 1 instar larvae after a period of incubation, during which the embryos develop inside the anopheline eggs.

Also disclosed are cryopreserved anopheline eggs (e.g., plurality of cryopreserved anopheline eggs) that hatch to release viable stage 1 instar larvae upon subsequent warming to ambient temperature; and cryopreserved anopheline eggs (e.g., plurality of cryopreserved anopheline eggs), a substantial proportion of which, proceeds through normal development to reproductively competent adults subsequent to warming to ambient temperature. In some aspects, the cryopreserved anopheline eggs disclosed herein have a hatch rate of at least between 1% and 60% or at least between 1% and 50%. In some aspects, the cryopreserved anopheline eggs disclosed herein have a hatch rate of at least 1%, at least 5%, at least 10%, at least 15%, at least 20%, at least 25%, at least 30%, at least 35%, at least 40%, at least 45%, or at least 50% or more. In certain aspects, the cryopreserved anopheline eggs have a hatch rate of at least 5%, at least 10%, or at least 25%.

In some aspects, the cryopreserved anopheline eggs are an *Anopheles* species that is susceptible to a *Plasmodium* species infection, including *An. stephensi, An. gambiae, An. albimanus, An. arabiensis, An. barberi, An. darlingi, An. dirus, An. freeborni, An. funestus, An. macuipennis, An. quadrimaculatus* and others, as well as chromosomally altered variants thereof. In some aspects, the cryopreserved anopheline eggs are selected from *Anopheles stephensi, Anopheles gambiae*, or a chromosomally altered variant thereof. In certain aspects, the cryopreserved anopheline eggs are from *Anopheles stephensi* or a chromosomally altered variant thereof. In some aspects, the cryopreserved anopheline eggs are from *Anopheles gambiae* or a chromosomally altered variant thereof.

Also disclosed are cryopreserved and thawed anopheline eggs, comprising viable hatchable anopheline eggs that develop to adult stage and are permissive for infection with *P. falciparum* parasites, wherein said parasites subsequently develop within said mosquitoes to produce salivary gland sporozoites. The resulting sporozoites display the ability to infect human liver cells in culture.

Also disclosed herein are adult-stage mosquitoes grown from viable stage 1 instar larvae, e.g., such as those that hatch from the cryopreserved anopheline eggs of the present disclosure when the cryopreserved anopheline eggs are warmed to ambient temperature and incubated for several days (e.g., at least one day, at least two days, at least three days, at least four days, at least five days, at least six days, or at least seven days or more) at ambient temperature. In certain aspects, the adult-stage mosquito is infected with a *Plasmodium*-species parasite, wherein the *Plasmodium*-species parasite develops to the sporozoite stage. In some aspects, the *Plasmodium*-species parasite develops to the sporozoite stage within the salivary gland of the adult-stage mosquito. In certain aspects, the *Plasmodium*-species parasite comprises *P. falciparum* (Pf), *P. vivax* (Pv), or both. In some aspects, the adult-stage mosquito oviposit (or produce) viable progeny.

The present disclosure further provides compositions comprising the cryopreserved anopheline eggs described herein (e.g., those that develop to viable stage 1 instar larvae upon subsequent warming the cryopreserved anopheline eggs to ambient temperature with subsequent incubation for several days (e.g., at least one day, at least two days, at least three days, at least four days, at least five days, at least six days, or at least seven days or more) at ambient temperature). In certain aspects, the composition further comprises a cryoprotectant additive (CPA).

In some aspects, the CPA is suitable for the cryopreservation of anopheline eggs. In some aspects, the CPA is selected from the group consisting of methanol, ethylene glycol, including isotopic variants thereof, and any combination thereof. In certain aspects, the CPA is at an aqueous concentration of at least 40%, at least 50%, at least 60%, at least 70%, at least 80%, at least 90%, at least 95%, at least 96%, at least 97%, at least 98%, at least 99%, or 100% v/v. In certain aspects, the CPA is at an aqueous concentration of between 50% and 100% v/v (e.g., 99% or 99.95%). In further aspects, the CPA is at a concentration of 100% v/v.

In some aspects, the CPA is methanol. In certain aspects, the CPA is H4-methanol. In certain aspects, the CPA is D4-methanol.

In some aspects, the cryopreserved anopheline eggs of the composition were cryopreserved at a temperature of $-50°$ C. or below. In certain aspects, the cryopreserved anopheline eggs of the composition were cryopreserved at a temperature of $-60°$ C., $-70°$ C., $-80°$ C., $-90°$ C., $-100°$ C., $-110°$ C., $-120°$ C., $-130°$ C., $-140°$ C., $-150°$ C., $-160°$ C., $-170°$ C., $-180°$ C., $-190°$ C., or $-200°$ C. or below. In some aspects, the cryopreserved anopheline eggs of the composition were cryopreserved at a temperature of $-60°$ C. or below. In certain aspects, the cryopreserved anopheline eggs of the composition were cryopreserved at below the glass transition temperature (Tg). In some aspects, the Tg is $-135°$ C.

In some aspects, at least 5%, at least 10%, at least 15%, at least 20%, at least 25%, at least 30%, at least 35%, at least 40%, at least 45%, at least 50% or more of the cryopreserved anopheline eggs of the composition are capable of hatching into viable first instar (e.g., stage 1) larvae. In certain aspects, the composition comprises a plurality of cryopreserved anopheline eggs, wherein at least 10% of the cryopreserved anopheline eggs are capable of hatching into viable first instar larvae upon subsequent thawing and a period of incubation at ambient temperature. In some aspects, the composition comprises a plurality of cryopreserved anopheline eggs, wherein at least 25% of the cryopreserved anopheline eggs are capable of hatching into viable first instar larvae upon subsequent thawing and a period of incubation at ambient temperature.

In some aspects, the cryopreserved anopheline eggs of the present disclosure are stored at or below −20° C. after the cryopreservation. In certain aspects, the cryopreserved anopheline eggs are stored at or below −30° C., at or below −40° C., at or below −50° C., at or below −60° C., or at or below −70° C.

Also disclosed are compositions suitable for cryopreservation of anopheline eggs comprising anopheline eggs in combination with a CPA, e.g., selected from methanol or D4-methanol.

As demonstrated herein, the disclosed cryopreservation methods have been used to bank *An. stephensi* strains including several transgenic lines, as well as *An. gambiae*. The development of this technology will profoundly impact mosquito vector biology research worldwide. Indeed, the inability up to now to practically maintain selected and genetically-manipulated anopheline strains has been considered one of the major impediments to sustained progress in the field.

EMBODIMENTS

Embodiment 1. A plurality of cryopreserved anopheline eggs comprising a substantial proportion of frozen anopheline eggs which develop to viable stage 1 instar larvae upon subsequent warming to ambient temperature.

Embodiment 2. The plurality of cryopreserved anopheline eggs of Embodiment 1 with a hatch rate of at least 10%.

Embodiment 3. The plurality of cryopreserved anopheline eggs of Embodiment 1 with a hatch rate of at least 25%.

Embodiment 4. An adult-stage mosquito grown from the viable stage 1 instar larvae of any one of Embodiments 1-3.

Embodiment 5. The adult-stage mosquito of Embodiment 4 which is infected with *Plasmodium*-species parasites, wherein said *Plasmodium*-species develop to the sporozoite stage.

Embodiment 6. The adult mosquito of Embodiment 4 or 5 which oviposit viable progeny.

Embodiment 7. The plurality of cryopreserved anopheline eggs of any one of. Embodiments 1-3, wherein the species of said eggs is *An. stephensi* or a genetically altered variant thereof.

Embodiment 8. The plurality of cryopreserved anopheline eggs of any one of Embodiments 1-3, wherein the species of said eggs is *An. gambiae* or a genetically altered variant thereof.

Embodiment 9. A composition comprising a plurality of cryopreserved anopheline eggs, wherein a substantial proportion of the plurality of cryopreserved anopheline eggs develop to viable stage 1 instar larvae upon subsequent warming to ambient temperature.

Embodiment 10. A composition comprising (i) anopheline eggs and (ii) a CPA selected from the group consisting of an isotopic variant of methanol, ethylene glycol, and any combination thereof.

Embodiment 11. The composition of Embodiment 10 wherein the CPA is at an aqueous concentration of between 50% and 100% v/v.

Embodiment 12. The composition of Embodiment 10 or 11 wherein the CPA is at a concentration of 100% v/v.

Embodiment 13. The composition of any one of Embodiments 10-12 in which the CPA is H4-methanol.

Embodiment 14. The composition of any one of Embodiments 10-12 in which the CPA is D4-methanol.

Embodiment 15. Embodiment 15. The composition of any one of Embodiments 10-15 cryopreserved at or below −135° C. (e.g., at or below −150° C.).

Embodiment 16. The composition of Embodiment 15 cryopreserved below −150° C. (e.g., −196° C.).

Embodiment 17. The composition of any one of Embodiments 10-16 in which at least 10% of said anopheline eggs are subsequently thawed and develop to hatched first instar larvae.

Embodiment 18. The composition of Embodiment 17 in which at least 25% of said anopheline eggs develop to hatched first instar larva upon thawing.

Embodiment 19. method for the viable cryopreservation of anopheline eggs comprising:
   a. First Incubating the anopheline eggs in 99.95%+/−0.05 v/v Methanol at a temperature between 0° C. and −18° C. for between 0 and 15 minutes;
   b. Second incubating the anopheline eggs in 100% v/v Methanol at a temperature of between −5° C. and −18° C. for a duration of between <1 minute and 120 minutes;
   c. First transferring the anopheline eggs to liquid nitrogen; and,
   d. Second transferring the anopheline eggs to vapor phase liquid nitrogen.

Embodiment 20. The method of Embodiments 19 wherein the temperature of the first incubation period is between −5° C. and −11° C.

Embodiment 21. The method of Embodiment 19 wherein the duration of the first incubation period is between 6 and 15 minutes.

Embodiment 22. The method of Embodiment 19 wherein the temperature of the second incubation period is between −14° C. and −16° C.

Embodiment 23. The method of Embodiment 19 wherein the duration of the second incubation period is between 10 minutes and 30 minutes.

Embodiment 24. The method of Embodiment 19 wherein the duration of the second incubation period is between 14 minutes and 20 minutes.

Embodiment 25. The method of Embodiment 19 wherein anopheline eggs are harvested at between 5 minutes and 60 minutes post-oviposition.

Embodiment 26. The method of Embodiment 25 wherein anopheline eggs are harvested between 5 minutes and 45 minutes post-oviposition.

Embodiment 27. The method of Embodiment 26 wherein anopheline eggs are harvested between 15 minutes and 30 minutes post-oviposition.

Embodiment 28. A method for the viable thawing of the cryopreserved anopheline eggs of any one of Embodiments 1-8 comprising thawing in water at a temperature between 0° C. and 42° C.

Embodiment 29. The method of Embodiment 28 where the water temperature is between 20° C. to 23° C.

Embodiment 30. A composition comprising a plurality of cryopreserved anopheline eggs and a cryoprotectant additive (CPA) at an aqueous concentration of between 50% and 100% v/v.

Embodiment 31. The composition of Embodiment 30, wherein the CPA is selected from the group consisting of an isotopic variant of methanol, ethylene glycol, and a combination thereof.

Embodiment 32. The composition of Embodiment 31, wherein the CPA is at a concentration of 99.95% to 100% v/v.

Embodiment 33. The composition of Embodiment 32 or 52, wherein the CPA is at a concentration of 100% v/v.

Embodiment 34. The composition of any one of Embodiment 31-32 or 52, wherein the CPA is H4-methanol.

Embodiment 35. The composition of any one of Embodiment 31-32 or 52, wherein the CPA is D4-methanol.

Embodiment 36. The composition of any one of Embodiment 30-35 or 52, wherein the anopheline eggs are cryopreserved and stored at or below −20° C. or −60° C.

Embodiment 37. The composition of any one of Embodiment 30-36 or 52, wherein the anopheline eggs are cryopreserved below the glass transition temperature (Tg) or −135° C.

Embodiment 38. The composition of any one of Embodiments 30-37 or 52 in which at least 5% of said plurality of anopheline eggs that are subsequently thawed, diluted and incubated, hatch and release viable first instar larvae.

Embodiment 39. The composition of any one of Embodiment 30-37 or 52 in which at least 10% of said plurality of anopheline eggs that are subsequently thawed, diluted and incubated, hatch and release viable first instar larvae.

Embodiment 40. The composition of any one of Embodiment 30-38 or 52 in which at least 25% of said plurality of anopheline eggs that are subsequently thawed, diluted and incubated, hatch and release viable first instar larvae.

Embodiment 41. The composition of any one of Embodiments 30-40, wherein the species of said anopheline eggs is susceptible to *Plasmodium* species infection.

Embodiment 42, The composition of any one of Embodiments 30-41, wherein the species of said plurality of anopheline eggs is *An. stephensi, An. gambiae*, or a chromosomally altered variant thereof.

Embodiment 43. A plurality of cryopreserved anopheline eggs, which, following thawing, dilution and incubation, hatch to release at least 5% viable first instar larvae.

Embodiment 44. The plurality of cryopreserved anopheline eggs of Embodiment 40, which, following thawing, dilution and incubation, hatch to release at least 10% or at least 25% viable first instar larvae.

Embodiment 45. The plurality of cryopreserved anopheline eggs of Embodiment 40 or 41, wherein the anopheline eggs are cryopreserved and stored at or below −20° C. or −60° C.

Embodiment 46. The plurality of cryopreserved anopheline eggs of any one of Embodiments 40-42, wherein the anopheline eggs are cryopreserved below Tg (the glass transition temperature or −135° C.).

Embodiment 47. Adult-stage mosquitoes developed from the viable first instar larvae of any one of Embodiments 38-40, 43, and 44.

Embodiment 48. The adult-stage mosquitoes of Embodiment 47, which are infected with *Plasmodium*-species parasites, wherein said *Plasmodium*-species parasites develop to the sporozoite stage.

Embodiment 49. The adult-stage mosquito of Embodiment 47 or 48, which oviposit viable progeny.

Embodiment 50. The plurality of cryopreserved anopheline eggs of any one of Embodiments 43 to 46, wherein the anopheline species of said eggs is susceptible to *Plasmodium* species infection.

Embodiment 46. The plurality of cryopreserved anopheline eggs of Embodiment 50, wherein the species of said eggs is *An. stephensi, An. gambia*, or a chromosomally altered variant thereof.

Embodiment 47. A method for the cryopreservation of a viable anopheline egg comprising:
   a) a first incubation of the anopheline egg in a solution comprising 99.5% to 100% v/v methanol at a temperature between 0° C. and −11° C. (e.g., −5° C. to −11° C.) for between 5-8 minutes;
   b) a second incubation of said anopheline egg at a temperature between −5° C. and −20° C. for 5-30 minutes;
   c) a first transfer of said anopheline egg to liquid nitrogen; and
   d) a second transfer of said anopheline egg to a refrigerated storage at a temperature equal to or less than −135° C. or less than −150° C.

Embodiment 48. The method of Embodiment 47, wherein the temperature of the first incubation period is between −5°

C. and −10° C. (e.g., −6° C. to −7° C.), and wherein the duration of the first incubation period is between 5 and 30 minutes.

Embodiment 49. The method of Embodiment 47-48, wherein the temperature of the second incubation period is between −5° C. and −20° C. (e.g., about −14° C.), and wherein the duration of the second incubation period is between 5 and 60 minutes.

Embodiment 50. The method of any one of Embodiment 47-49, wherein anopheline eggs are harvested at between 15 minutes and 30 minutes post-oviposition.

Embodiment 51. The method of any one of Embodiment 47-50, wherein said anopheline egg of (d) comprises a plurality of anopheline eggs wherein at least 5% hatch to release viable stage 1 instar larvae subsequent to warming to ambient temperature with concomitant dilution and after a period of incubation for the embryos to develop inside the eggs.

Embodiment 52. A composition comprising a plurality of cryopreserved anopheline eggs and a CPA selected from the group consisting of an isotopic variant of methanol, ethylene glycol, and a combination thereof at an aqueous concentration of between 50% and 100% v/v.

Embodiment 53. The method of any of Embodiments 47-51, wherein subsequent to the refrigerated storage of (d), the anopheline egg is warmed at rate of at least 1,000° C./min and diluted with a CPA at a dilution of at least 1:10 or at least 1:100.

Embodiment 54. The method of any one of Embodiment 47-51 or 53, wherein said anopheline egg of (d) comprises a plurality of anopheline eggs wherein at least 5% hatch to release viable stage 1 instar larvae subsequent to warming to ambient temperature.

Embodiment 55. The method of Embodiment 54 further comprising warming the plurality of anopheline eggs at a rate of at least 30,000° C./min and a CPA dilution of at least 1:500.

BRIEF DESCRIPTION OF THE FIGURES

In FIG. 4A the second incubation temperature was −14.5° C. for 14 min 20 sec. In FIG. 4B, the first incubation step was −7° C. for 6 min 40 sec.

FIG. 6A shows viable control eggs not exposed to CPA and not cryopreserved at 1 day post-oviposition. FIG. 6B shows cryopreserved and thawed eggs showing viable eggs (dark) and non-viable eggs (light). FIG. 6C shows stage 1 instar larva hatched from cryopreserved egg.

DETAILED DESCRIPTION

Definitions

Figure 1:
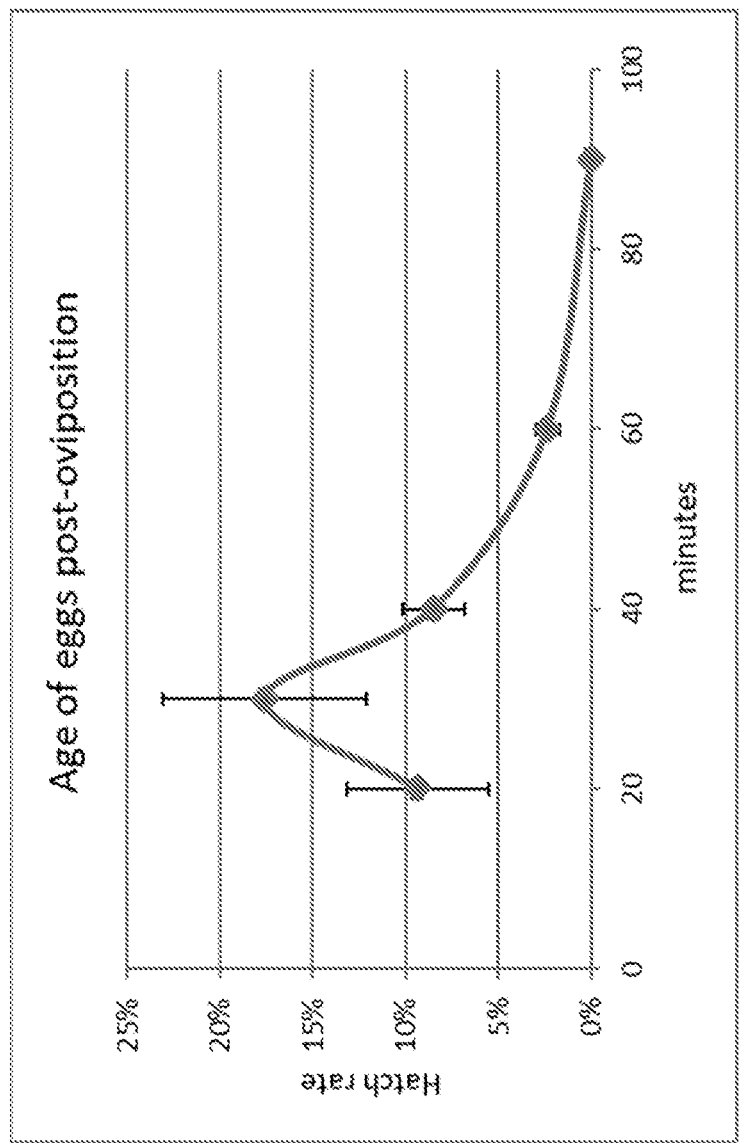
FIG. 1 shows the effect of age of eggs on ability to survive cryopreservation. Eggs were laid onto water starting at t=0 minutes and were harvested at 15 minutes and then incubated for different times before being cryopreserved. The graph shows the maximum age of any egg at the time of cryopreservation (for example 20 minutes=15 minutes collection+5 minutes incubation). Error bars=standard deviation of three replicates. Peak recovery occurred with eggs harvested after allowing the mosquitoes to oviposit for 15 minutes followed by incubation at ambient temperature for 15 minutes: eggs were therefore between 15 (min) and 30 (max) minutes old at the start of the cryopreservation process.
Figure 2:
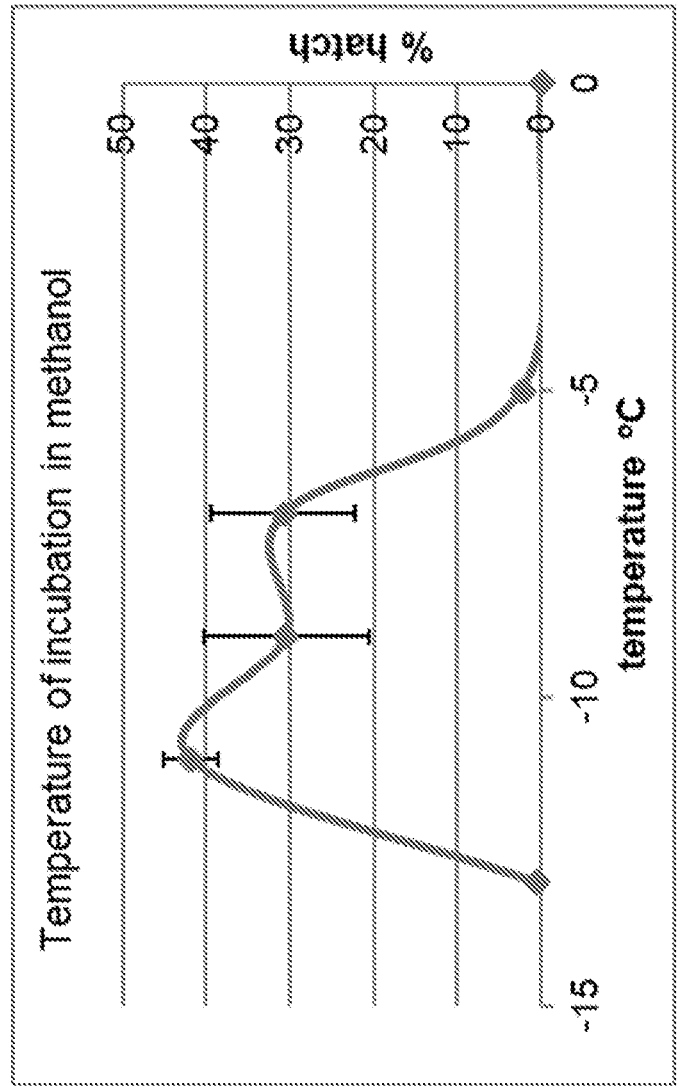
FIG. 2 shows the survival (% hatch) of eggs following incubation in 100% methanol for 15 min at temperatures between 0° C. and −13° C. without subsequent cooling and recovery into 22° C. water. Control eggs warmed/diluted from −11° C. ("Control"); eggs subsequently cooled in LN2 ("LN2") before warming/dilution.

Unless specified otherwise, all numerical ranges provided herein encompass a variance of 10 percent, up or down (higher or lower). For example, a temperature of 10° C. encompasses a temperature range of between 9° C. and 11° C.

As used herein the term "ambient" means similar to the immediate surroundings, or in an incubator equivalent to immediate surroundings, typically between 15° C. and 30° C. and most commonly 26° C. to 28° C. as used in the rearing of *Anopheles* spp mosquito.

As used herein, the term "anopheline" means mosquitoes and eggs of the genus "*Anopheles*". *Anopheles* includes all *Anopheles* spp mosquitoes that can act as vectors for *Plasmodium* spp, which in turn includes those that cause malaria. In some aspects, the *Anopheles* spp. comprises *An. stephensi, An. gambiae, An. albimanus, An. arabiensis, An. barberi, An. darlingi, An. dirus, An. freeborni, An. funestus, An. macuipennis, An. Quadrimaculatus*, including chromosomally altered variants thereof, or combinations thereof.

As used here, the term "chromosomally altered" means a sporozoite whose chromosome has been altered, for example by radiation exposure, genetic manipulation or other means known to those skilled in the art.

As used herein, the term "cooling" means decreasing in temperature.

As used herein, the term "cryoprotectant" refers to a substance that prevents damage to cells during freezing. In certain aspects of the application, the cryoprotectant comprises an admixture of 1 or more chemical compounds including additives that exhibit, among their properties, the ability to lower the freezing point of the external medium and of the interior of the cells, induce shrinkage during addition and/or facilitate cell shrinkage during cooling, protect cell and organelle membranes, proteins and nucleic acids, and/or prevent or slow the nucleation and propagation of ice crystals. Unless indicated otherwise, the terms "cryoprotectant" and "cryoprotectant additive" (CPA) are used interchangeably.

As used herein, the term "cryopreservation" or "cryopreserved" with regard to insect eggs (e.g., anopheline eggs) refers to eggs that are preserved by freezing. In certain aspects of the application, cryopreservation comprises the use of a cryoprotective additive (CPA) and cooling eggs to freezer temperatures of less than −20° C., and preferably below −135° C. (Tg), such that, upon warming, a substantial percentage of the eggs have retained their viability and will subsequently hatch after a period of incubation at ambient temperature. Not to be bound by any one theory, in certain aspects, cryopreserved anopheline eggs that retain their viability, after a period of incubation, are able to complete development to first instar, L1, larvae and hatch.

As used herein, the term "egg" means an organic vessel containing a zygote from which an embryo can develop until it can hatch and survive on its own.

As used herein, the term "embryo" means the cellular or syncytial or multicellular entity within an egg that has the potential to develop further into post-embryonic stages.

As used herein, the term "egg hatch rate" means the number of stage 1 instar anopheline larvae hatching as a proportion of the number of eggs examined.

As used herein, the term "freezing" means transition of water or a composition comprising water from an aqueous liquid phase to an aqueous crystalline or amorphous solid phase.

As used herein, the term "substantial proportion" or "substantial percentage" (or derivatives thereof) means at least 5%.

As used herein, the term "suspended animation" means the viable and reversible cessation of most vital functions including development.

As used herein, the term "thawing" means transition of water or compositions comprising water from an aqueous crystalline or amorphous solid phase to an aqueous liquid phase.

As used herein, the term "viable" means the ability to resume and/or proceed with normal development, upon thawing and warming to ambient temperature, to hatching of the egg.

As used herein, "vitrification" of eggs and embryos means a manner of cooling eggs and embryos. In certain aspects of the application vitrification may include the presence of CPAs, with none to minimal ice nucleation and none to minimal subsequent crystal growth, resulting in an amorphous solidification of the intracellular contents of the embryo.

As used herein, the term "warming" means increasing in temperature.

In some aspects, being able to cryopreserve *Anopheles* species eggs would improve the feasibility of mosquito-based malaria control methods. For example, the ability to cryopreserve *An. stephensi* eggs would provide: 1) a genetically stable uniform seed stock of source material for vaccine production; 2) an insurance against colony crash or genetic drift; 3) a source to establish new colonies at new sites where anopheline mosquitoes are needed, including for the manufacture of PfSPZ Vaccine and other products; and 4) establishment of a repository for the many anopheline species and the increasing number of transgenic anopheline strains. Importantly, a bank of cryopreserved anopheline eggs would significantly reduce the high costs associated with mosquito maintenance.

Previous attempts to cryopreserve anopheline eggs and larvae have been unsuccessful. Although many insect species, including *Culex* mosquitoes, can withstand severe cold, even freezing, under natural conditions (Reinhart, et al., 2006; Bale, 2002), and *Aedes*-species of mosquitoes are well known for their ability to withstand drying and medium term storage (Briegel, 1990; Juliano et al., 2002), anopheline mosquitoes generally respond to adverse environmental conditions by prolonged survival of only a impractically small population of adults (Charlwood, Vij and Billingsley, 2000) which at the very least, require constant access to moist egg laying substrates (Minakawa et al., 2001). Eggs of *An. gambiae* die within days of partial desiccation (Shililu et al., 2004) and the eggs of neotropical anophelines show little or no tolerance for chilling or freezing.

There have been many attempts to preserve anopheline eggs, embryos, or larvae. Compounds such as ethylene glycol and methanol, used for cryopreservation of other organisms, proved to be highly toxic to larvae of *An. gambiae* when used with common methodologies (Liu, Pan and Mazur, 2003) and partial desiccation of larvae in conjunction with sucrose or trehalose treatment was also detrimental (Liu and Mazur, 2003).

Published attempts to cryopreserve eggs/embryos of *An. gambiae* were based largely on the methods used for the successful cryopreservation of *Drosophila* embryos (Steponkus et al., 1990; Mazur et al., 1992) because of the presumed similarities in the challenges to be overcome, in particular to the lack of permeability of the eggs to cryoprotectants, and the extremely low tolerance of eggs to chilling. Success with the cryopreservation of *Drosophila* embryos entailed a pragmatic approach: testing different cryoprotectant additives (CPAs) and techniques on embryos at different stages of development inside the eggs. Unexpectedly, embryos tested 12- to 13-hours after laying rather than the earlier embryonic stages best survived cryopreservation. CPA permeation was achieved by removal of the outer chorion using hypochlorite, heptane and butanol. Subsequent successful cryopreservation entailed incubation in ethylene glycol in two steps coupled with a defined rate of cooling.

Despite gathering considerable data on the physical properties of water content and intraembryonic ice formation in *An. gambiae* (Schreuders et al., 1996), successful cryopreservation of anopheline embryos inside the eggs has remained elusive. Intact eggs of *An. gambiae* are highly permeable to water, significantly more so than *Drosophila*, but unlike *Drosophila* are relatively impermeable to ethylene glycol (Valencia, Miller and Mazur, 1996a), thereby negating the same methodologies for cryopreservation. The authors applied the same process of dechorionation and concluded that the "*D. melanogaster* permeabilization procedure is effective in permeabilizing *An. gambiae* embryos (15 h/17° C. to 19 h/17° C.) to water and ethylene glycol, but it is 100% lethal". Other permeablization reagents (heptane, butanol) were similarly unsuccessful, being extremely toxic to the embryos as well as causing desiccation damage (Valencia, Miller and Mazur, 1996b). In the mosquito community at large, there is anecdotal evidence of other failed attempts to cryopreserve anopheline eggs, and the 20+ year gap in the literature on this subject from the mid-1990's to present testifies to the perception that the problem is considered intractable. However, recognition of the great importance of achieving anopheline strain preservation technology has remained.

Unlike the eggs of *Aedes*-species, which can tolerate partial desiccation (Kliewer, 1961; Christophers, 1960; Farnesi et al., 2015) and be stored for many months at refrigerator or ambient temperatures, *Anopheles*-species eggs survive for only 24 hours or less at 20-55% relative humidity (Farnesi et al., 2015; Rezende et al., 2008; Vargas et al., 2014), (some limited protection against water loss is provided by the serosal cuticle containing chitin (Farnesi et al., 2015) that surrounds the embryo). Maintenance of *Anopheles*-species thus requires continuous life cycle management, a process that is labor intensive, expensive and vulnerable to colony loss.

Successful cryopreservation of living organisms depends in large part on the management of intracellular water. This is usually accomplished through removal of as much freezable water as can be tolerated by the cell(s) coupled with stabilization of the remaining water to prevent and/or control the amount of intracellular ice formation, while limiting potentially toxic "solution effects" (Mazur, et al., 1972). The inclusion of permeating cryoprotectant additives (CPAs), particularly the higher molecular weight compounds, or low molecular weight compounds in combination with rapid cooling, facilitates vitrification (James, 2004) (conversion into amorphous non-crystalline solid water), that is stable below the glass point (Tg, glass transition temperature).

Cryopreservation of Anopheline Eggs

The invention disclosed herein has uniquely provided viable anopheline eggs in a state of cryopreserved, suspended animation, and identified the methodologies for successful cryopreservation and reanimation of substantial percentages (greater than 5%) of cryopreserved eggs. In certain aspects, the process comprises the identification of acceptable CPA, including isotopes of methanol and ethylene glycol, and concentrations, from 50% to 100%, as well as the time and temperature parameters for cooling of eggs and CPA to appropriate temperatures, and the time, temperature and diluent parameters, for warming cryopreserved eggs to ambient temperatures, including dilution in water at between 0° C. and 42° C. as described below.

The formation of mosquito eggs is triggered by a bloodmeal in the parent female mosquito. Once the eggs, each of which contains an embryo, are laid, a series of events occurs leading over 2+ days to hatching of the first instar larvae (L1). Each egg, composed of an embryo surrounded by chorion, is soft and white when laid but sclerotization begins and within a few hours, the egg turns brown and then black as phenoloxidases are activated in the chorion or exochorion (depending upon species—this is not known for *An. stephensi*) (Christensen et al., 2005). In anophelines, hardening of the chorion offers little protection against desiccation but in Ae. *aegypti* hardening is accompanied by an increase in resistance to desiccation. Within the egg, the series of events comprising embryogenesis includes initial nuclear divisions to form a syncytium, subsequent cell wall propagation, cell divisions, blastoderm formation, cell movements to form the embryonic precursors of larval tissues (e.g. midgut, Malpighian tubules, salivary glands), and eventual formation of a larva, which hatches from the egg (for review see Clements, 1992 chapters 2 and 3). Thus, in normal anopheline egg development, eggs hatch to release viable stage 1 instar larvae at ambient temperatures, e.g., temperatures starting generally on day 2 following oviposition. The timing of these events is temperature dependent.

Cryopreservation arrests all cellular metabolic activity and places cryopreserved organisms into a state of suspended animation. This state of cryopreserved anopheline eggs (suspended animation) is not found in nature for anopheline mosquitoes. Cryopreserved specimens can effectively be stored indefinitely if the temperature of storage is below Tg (the "glass transition temperature", generally regarded as approximately −135° C. for aqueous-based material) and for more limited storage periods at higher subzero temperatures. Successful cryopreservation implies that, with proper warming, dilution, and appropriate conditions of nutrient and environmental conditions (see below), normal development is resumed in at least a substantial proportion of cryopreserved eggs. As disclosed herein, attaining successful cryopreservation includes the presence of one or more cryoprotectant additives (CPA), including for example, isotopes of methanol, ethylene glycol or combinations thereof, and appropriate rates of cooling and subsequent warming. CPAs provide protection against several of the potentially damaging events that occur during cooling down to the final temperature of storage, and function by mechanisms that include, partial desiccation, lowering the freezing point of the external medium and of the interior of the cells, reducing the amount that cells shrink during cooling, protecting cell and organelle membranes, and preventing or slowing the nucleation and propagation of ice crystals. They also protect against biochemical changes, including oxidation, and can replace structural water in proteins and membranes. At high concentrations, CPAs may also increase solvent viscosity and facilitate vitrification— which requires use of a high CPA concentration and/or rapid cooling). The events that occur during warming/thawing and the removal of CPAs are also potentially damaging and may require control of temperature and rate.

Provided herein are methods for cryopreservation and subsequent thawing resulting in a substantial hatch rate, of at least 5%, in another embodiment, 10%, preferably 15%, more preferably 20%, most preferably at least 25%, of anopheline mosquito eggs, particularly anopheline mosquito eggs that are susceptible to *Plasmodium* species infection. This includes eggs of *An. stephensi, An. gambiae, An. albimanus, An. arabiensis, An. barberi, An. darlingi, An. dirus, An. freeborni, An. funestus, An. macuipennis, An. quadrimaculatus* and others, as well as chromosomally altered variants thereof. Also provided are anopheline mosquito eggs that have been cryopreserved such that subsequent to thawing, dilution and further incubation, at least a substantial percentage (e.g., at least 5%) retain the potential for normal growth and development, as well as and hatching to release L1 instar larvae. Furthermore, in some aspects, the hatched larvae demonstrate the ability to grow and develop at ambient temperature through subsequent larval stages, to pupate and to exclose to release viable adult mosquitoes. Also demonstrated is the ability of the adult mosquitoes generated from the cryopreserved eggs to exhibit the characteristics of adult mosquitoes, including the ability to become infected with *Plasmodium* parasites and to produce viable offspring.

Figure 6C:
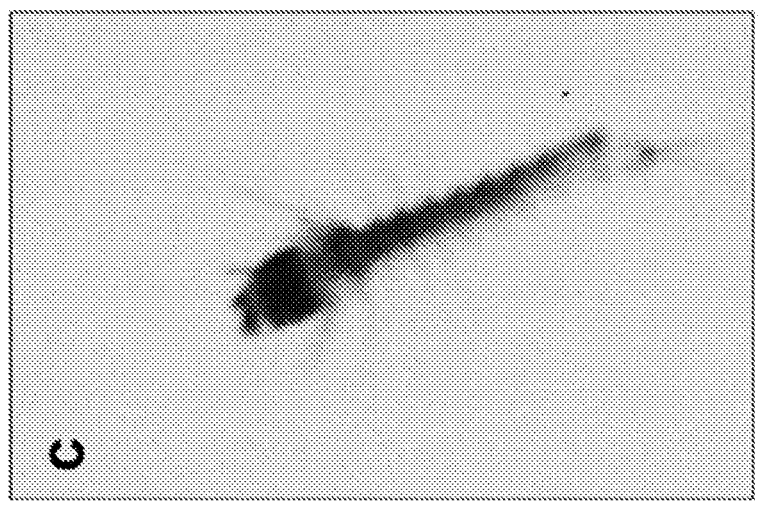
FIGS. 6A, 6B, and 6C show the effect of cryopreservation on egg viability and hatching of *An. stephensi*.
Figure 6B:
Figure 6A:

Disclosed herein are CPAs and a subsequent cooling and warming protocol which resulted in the first ever successful cryopreservation of anopheline embryos (FIGS. 1-5). Using the screening methodology described in Example 1, a CPA mix and protocol were identified that allowed hatching of first larvae from eggs cryopreserved and stored below −180° C. (FIG. 6*c*) and subsequent survival to second instar and beyond.

Mosquito Embryo Collection:

*An. stephensi* SD500 strain mosquitoes were blood fed on human type-A blood through an artificial membrane and housed in standard 300×300×300 mm cages. Three days post-feeding, a 120 mm diameter Petri dish containing ~75 mL water was introduced into the cage and the mosquitoes were allowed to oviposit. Initially, the Petri dish with water was available for egg laying for 60 min. Later, with the need to test a more uniform population of eggs at earlier stages of development, collection times of 45', 30', 15', 10', 5' were tested and egg collection was standardized at 15 minutes. Any dead mosquitoes or mosquito fragments were removed. The floating eggs were swirled around the Petri dish so the majority became adherent to the sides of the dish and to the lid—facilitating collection of eggs in large numbers using, for example, artists paint brushes (No. 4 black-tipped angular shader, MSPCI). Water was decanted or aspirated from the Petri dish before egg collection.

Approximately 10,000 eggs were collected on the upper side of one brush. Surface moisture was removed from the eggs by blotting the lower side of the brush on a paper towel immediately before transfer into 2 mL of CPA. When the eggs were placed in 100% v/v methanol, the residual moisture was estimated to account for less than 0.5% of the final composition (CPA: 99.5%+/−0.5%).

CPA:

Viable eggs can be successfully cryopreserved using a single CPA incubation step, however, hatch rates were improved if incubation in CPA occurred in more than one sequential step at different temperatures before final cooling to the temperature of storage. CPA was contained in a polypropylene 19 mm diameter×19 mm deep paint mixing pot (Michaels 10271583) embedded in a custom aluminum block machined to cover a Peltier-cooled block (Torrey Pines Scientific, IC22XT). CPA was equilibrated to temperature for >2 h prior to addition of eggs for the first incubation step at −6.8° C. Temperature was monitored using a digital thermometer with type-T thermocouple probe in a control sample in the block. Several relatively low molecular weight CPAs were evaluated at different concentrations for toxicity by incubation at 0° C. for up to 15 minutes, including: dimethylacetamide, dimethylformamide, dimethyl sulphoxide, ethanol, ethylene glycol, formamide, glycerol, H4-methanol (also referred to herein as "methanol"), D4 (deuterated)-methanol, D4/$^{13}$C-methanol, methylacetamide, propanediol, (sourced from SigmaAldrich); combinations in different ratios were also evaluated. D4-methanol was from Acros Organics (321281000) and was found to give best results.

Percentages (v/v) of methanol and D4-methanol in water solutions were evaluated at between 50% and 100% aqueous CPA, namely, 50%, 70%, and 90%, and compared to CPA concentrations of 100%. Although a small percentage of viable eggs was found for methanol and D4-methanol at 50%, the viability increased with the increase in concentration of these CPAs (data not shown), and was highest with 100% CPA.

Cooling:

The first incubation step in CPA occurred using a Torrey Pines Scientific dual cold block (Ecotherm IC22) and the second incubation step was initially conducted using a second Torrey Pines Scientific unit. Subsequently the second cooling step used a custom aluminum block 300 mm×100 mm×45 mm high with 8 holes 21.5 mm ID×12.5 mm deep on the top surface to accept the CPA containers and with three tiered steps, each 15 mm wide running the length of the unit on which the membranes were placed. The block was chilled by antifreeze (PolyScience, Polycool HC-50) using a pump (Cole Parmer, UX-12122-02) to circulate the antifreeze through ~500 mm of channel machined into the interior of the block. Membranes to support the aliquots of eggs in CPA were cut to approximately 20 mm×6 mm. Various membrane materials (thickness given in parenthesis) were tested including glass coverslip (Fisher 12-548-5A: 0.16 mm thick), solid nylon (0.10 mm and 0.12 mm), fabric mesh (0.06 mm), Nylon 0.22 µm porous filter (GVS North America, 0.12 mm), filter paper (Whatman 1004-050, Thomas 4740C10: 0.15 mm), aluminum kitchen foil (0.01 mm), black paper (black licorice 104 GSM (28/70 lb Text): 0.16 mm) and black cardstock (0.24 mm). Of these the easiest to work with and that which gave best results, was the black paper—advantages: relatively thin, semi-porous allowing CPA to permeate and contact the aluminum cold block and to reduce the surface thickness of the sample on the membrane and improve the contact of the eggs with the LN2 during plunge, and the black color provided contrast and easy visualization of the pre-sclerotized white eggs.

Eggs in CPA were transferred to a support membrane resting on a step of the custom aluminum cold block. Sample volumes of 20 µL (20-40 µL were evaluated) were dispensed onto the membranes using a P200 pipettor (Ranin) with truncated tips (internal tip diameter 2 mm). Egg transfer to the membranes commenced 10 to 30 seconds before the final plunge cooling step into LN2.

The final cooling (plunge into LN2) step occurred by holding each membrane with fine forceps and transferring them rapidly into the refrigerant—either boiling point nitrogen (bpLN2) at −196° C., or chilled nitrogen between −202° C. and −210° C.—contained in a small (70 mm ID×110 mm) wide mouth vacuum flask. Chilled nitrogen was produced by applying a lid to the flask connected via a tube to a vacuum source. The membrane was held under the surface of the LN2 for ~2 sec and then transferred to temporary storage in a 12-hole aluminum block in bpLN2 in an insulated container. From there, membranes were either transferred into chilled cryovials (Nunc 2.0 mL) and placed into long-term storage at a temperature below −150° C., usually between −150° C. and −196° C., in a freezer, including electromechanical, liquid nitrogen vapor phase (LNVP), or other form of refrigerated storage, preferably in a LNVP freezer (less than −150° C., CBS V1500) or were thawed and the hatch rate determined.

Thawing/CPA Dilution:

Cryopreserved eggs on support membranes were thawed and diluted to reduce CPA concentration in a single step by rapidly transferring the membrane into a stream of water from a laboratory squirt bottle directed into a 35 mm diameter Petri dish. Final volume of water was 10 mL, so that the effective CPA dilution was approximately 500-fold. Water at temperatures between 0° C. and 42° C. was tested, and additionally ~2 mL water was evaluated at each temperature, squirted over the membrane into a Petri dish containing 8 mL of water at 22° C., bringing the volume of each thawing test to 10 mL.

Assessment of Survival:

Once the first larval hatching was recorded, subsequent experiments recorded the percentage of larval hatch rate (number of larvae×100/number of eggs in the Petri dish) on day-3 post-thaw, and this was used as the measure of survival. In experiments measuring full development, the hatched larvae were fed standard larval food, pupae were harvested and transferred to rearing pans in 300×300×300 mm cages for adult mosquito emergence.

The ability of mosquitoes to become infected with *Plasmodium*-species parasites, in particular *P. falciparum* (Pf), was determined by membrane feeding (as above) of female mosquitoes through a membrane on blood containing 0.5% stage V Pf gametocytes.

Figure 3:
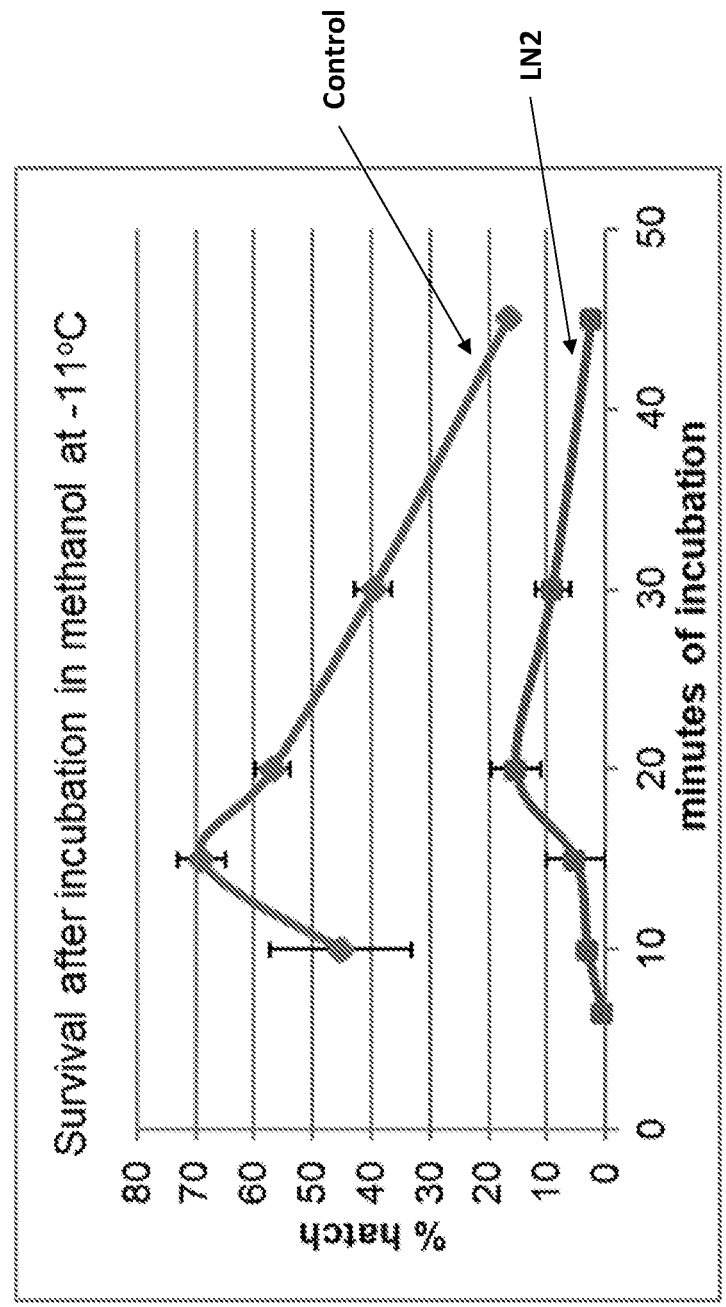
FIG. 3 shows the survival (% hatch) of eggs following incubation in 100% methanol for periods of 10 to 45 minutes at −11° C. and subsequent dilution in 22° C. water.
Figure 4B:
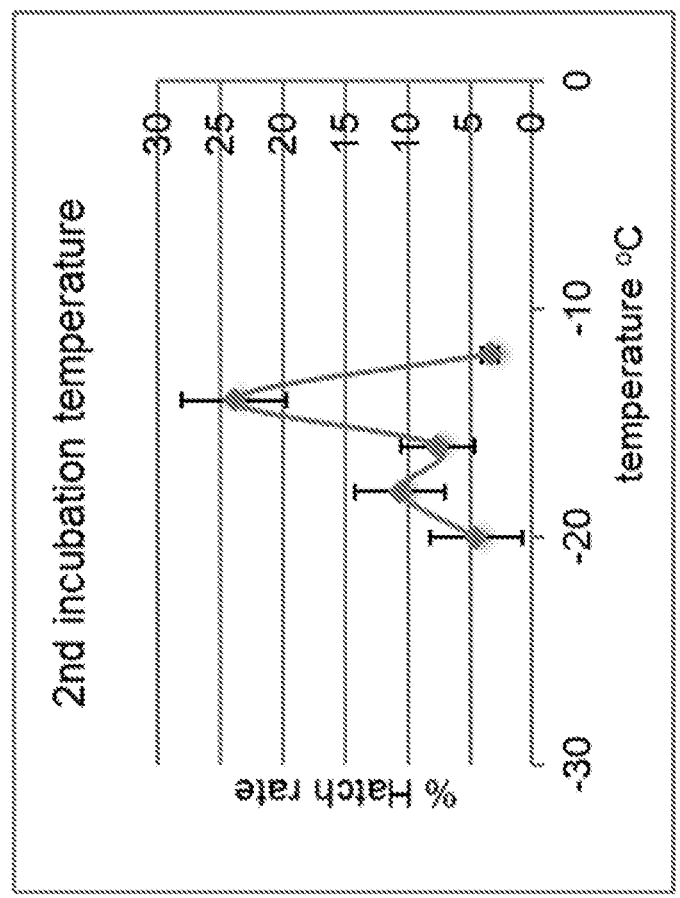
FIGS. 4A and 4B shows the effect of incubation temperatures for the first (FIG. 4A) and second (FIG. 4B) incubation steps.
Figure 4A:
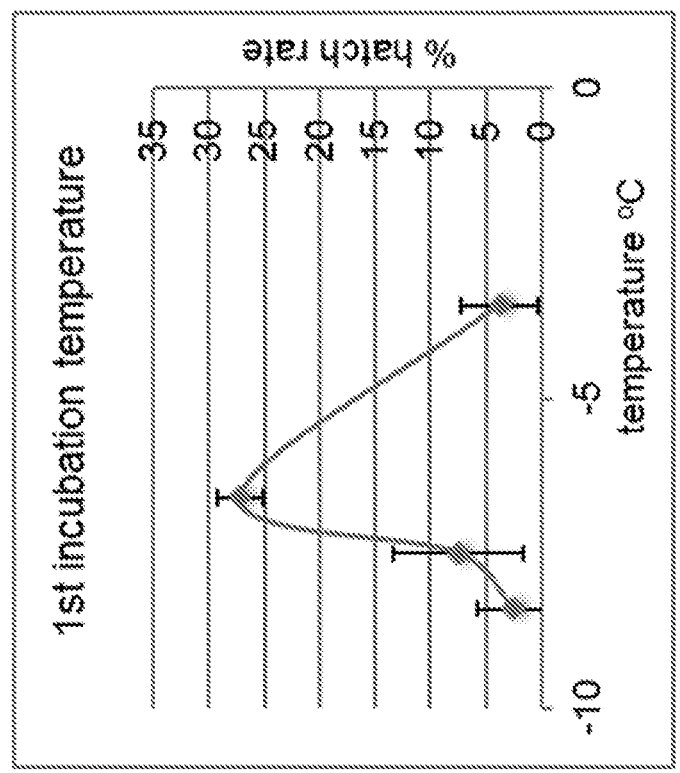
Figure 5:
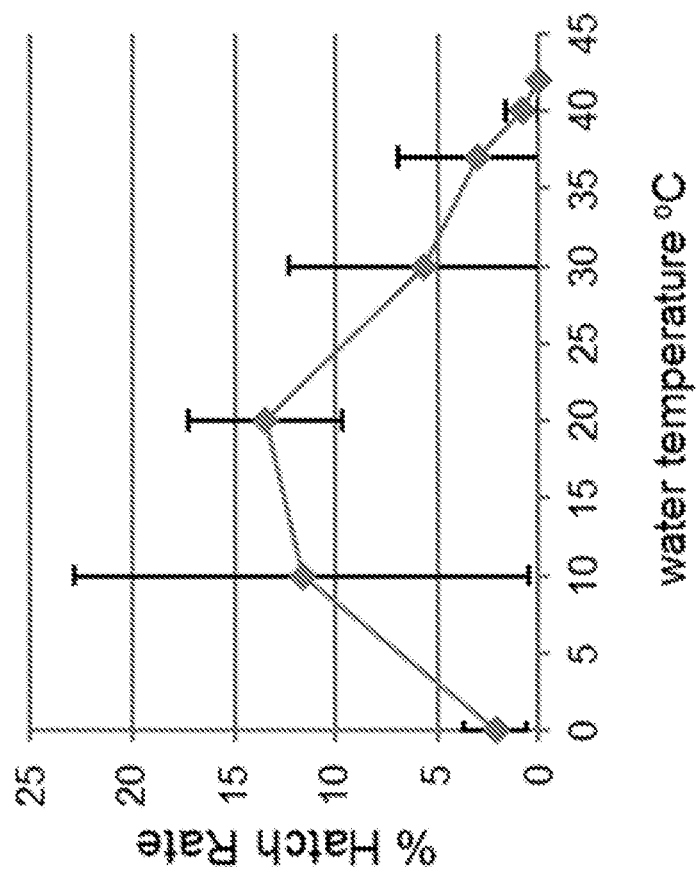
FIG. 5 shows the effect of thawing/diluting using water at temperatures between 0° C. and 42° C. Final volume of water was 10 mL producing a dilution of 1:500.

Optimization:

Methanol, though not tolerated well by many cell types, has been used as a highly effective CPA for a number of invertebrates, including protozoa (James, 2004) trematodes (James and Farrant, 1977; James, 1980) and nematodes (Smith et al., 1990), and also fish eggs (Anderson et al., 2009). Methanol is the lowest molecular weight CPA and the only CPA that appears to be tolerated by, and to permeate, untreated *Anopheles* eggs. Tolerance is temperature (FIG. 2) and time (FIG. 3) dependent and the hatch rate of larvae from eggs exposed to 100% methanol in a single step was highest with a 15-minute incubation at −11° C. A proportion, 15.3±4.3%, of eggs incubated for 20 minutes at −11° C. hatched after subsequent cooling, and warming/dilution (FIG. 3).

The survival of *Anopheles* eggs exposed to methanol and cryopreserved is also dependent on the age of the eggs (FIG. 1).

Embryos of most species cryopreserve optimally when cells are undifferentiated (Wood et al., 1992; Rall and Wood, 1994) when the embryo can tolerate loss of a proportion of cells without subsequent development being impaired. Unusually, the post-oviposition age for successful cryopreservation of *Drosophila* eggs was found to be 12-13 hours (Steponkus et al., 1990; Mazur et al., 1992) when embryo development is nearly complete. Survival was reported to be ~10% (Steponkus et al., 1990; Mazur et al., 1992) assessed by hatching. Despite concerted efforts, this method was not transferrable to *Anopheles*-species mosquitoes (Valencia et al., 1996a, 1996b). *Anopheles* eggs are fertilized at oviposition and the subsequent development moves from a syncytial stage to cellularization and early gastrulation at approximately 4 hours (Monnerat et al., 2002) and larval emergence 48-72 hours later at 28° C. By harvesting eggs synchronized to between 15-30 minutes old, measured from the start of oviposition when the embryo is at the syncytial stage and the eggshell is relatively permeable to water (Goltsev et al., 2009) and to low molecular weight CPAs, there is no need to permeabilize. *Anopheles* eggs incubated in methanol initially shrink but then begin to regain some volume indicating that the initial water loss was followed by at least partial permeation of methanol.

CPA toxicity is both temperature and time dependent. By reducing the temperature of incubation in the CPA, the eggs can tolerate a longer exposure and presumably reach a higher internal concentration of CPA which enhances protection during cooling. It was found that by performing the CPA incubation in two steps, first at between 0° C. and −18° C., preferably between −5° C. and −11° C., most preferably at −6° C. to −7° C. for between 2 and 120 minutes, preferably between 5 and 8 minutes, most preferably for 6 to 7 minutes and then a second incubation at between −5° C. and −20° C., preferably between −10° C. and −15° C., most preferably at about approximately −14° C. for between 5 and 120 minutes, preferably between 10 and 20 minutes, most preferably for 14-15 minutes, the larval hatch rate from cryopreserved eggs could be improved.

The basic parameters for the optimized cryopreservation method for *An. stephensi SD*500 mosquito eggs were thus established as: 1) eggs at between 15-30 minutes post oviposition with immediate placement into CPA; 2) incubation in 100% v/v methanol for 6 minutes 40 seconds at −6.5° C., followed by; 3) 14 minutes 20 seconds at −14° C., followed by; 4) transfer and immediate plunge into LN2; followed by 5) transfer to liquid nitrogen vapor phase.

Cooling Rate:

Using the basic cryopreservation method outlined above, two cooling rates were compared: by plunging into boiling point LN2 at −196° C. (cooling rate approximately 12,240° C. min$^{-1}$) or into chilled LN2 below −202° C. (cooling rate approximately 21,670° C. min$^{-1}$). Using chilled LN2 leads to marginally improved, though not statistically significant, hatch rates (Table 1).

CPA—Methanol Vs D4-Methanol:

Using the basic cryopreservation method outlined above, isotopic variants of methanol were considered, including methanol, D4-methanol and D4/$^{13}$C-methanol. The two variants of hydrogen within the methanol molecule were: H4-methanol and D4-methanol. H4-methanol is comprised of a carbon atom, an oxygen atom, 4 protium hydrogen atoms (each having a nucleus consisting of a single proton), including the hydrogen within the hydroxide moiety. D-4 methanol is comprised of a carbon atom, an oxygen atom, and 4 deuterium atoms (each having a nucleus consisting of a proton and a neutron), including the deuterium within the hydroxide moiety. Using D4-methanol, coupled with cooling by plunge into chilled LN2, leads to marginally improved hatch rates (Table 1). Since a rapid cooling rate is required to cryopreserve the eggs, the internal contents of the eggs have most likely vitrified. Viscosity plays a role in the process of vitrification and, at least at ambient temperatures, D4-methanol is approximately 11% more viscous than H4-methanol (also referred to herein as methanol) (Anon, 2013).

TABLE 1

Effect of two CPAs, deuterated methanol (D4-methanol) vs methanol, in combination with cooling by plunge into liquid nitrogen (LN2) at −196° C. (boiling point LN2) vs LN2 at below −202° C. (chilled). Thirteen experiments were run and the hatch rates for eggs in each of the four groups were ranked 1 (best) to 4 in each experiment and the average of the ranked scores for each methodology was calculated.

Average ranked score

| | | CPA | |
| --- | --- | --- | --- |
| | | D4-Methanol | Methanol |
| LN2 plunge | Chilled −202° C. | 2.20 | 2.27 |
| | Boiling −196° C. | 2.47 | 2.87 |

Thawing and CPA Dilution:

Thawing and dilution to remove the CPA were conducted simultaneously by rapidly introducing the membrane with eggs into a stream of water collected into a Petri dish. Since cooling into LN2 was rapid, the optimum warming rate would be expected to be fast (Seki and Mazur, 2009). CPA toxicity, however, is temperature dependent so that if the water temperature is too high while the CPA is still diffusing out of the eggs, the eggs may be damaged by CPA toxicity. Samples from a batch of cryopreserved eggs were thawed/diluted using water at temperatures between 0° C. and 42° C. (higher temperatures up to 80° C. were also tested where 2 mL was run over the eggs and the thawed eggs collected in the Petri dish pre-loaded with 8 mL water at ambient temperature—small numbers of eggs, decreasing with increasing temperature, were recovered for all temperatures). The results shown in FIG. 5 indicate that the optimum temperature for the water used for thawing/dilution is room temperature (−20° C. to 22° C.). Thawing using 2 mL water at any temperature with recovery into 22° C. water did not improve survival.

The speed of addition of the warming/diluting water was varied and the most rapid exposure was found to be superior (data not shown). Warming/dilution into a stream of 22° C. water to a final volume of 10 mL produces an initial warming rate of approximately 30,400° C. min' and a 1:500 dilution of the CPA.

Storage:

Samples of cryopreserved eggs with a hatch rate of 20% after cryopreservation and subsequent incubation of the thawed/diluted eggs for 3 days at 28° C. by the then not-yet-optimized method, were also removed from storage and thawed/diluted after increasing intervals of time. After 2.5 years of storage the hatch rate was 17.6±3.9% indicating stability with time and no loss in viability.

Susceptibility to *Plasmodium falciparum* Infection:

To test the vectorial capability of the adult *An. stephensi* reared from cryopreserved and thawed eggs, adult females were membrane-fed on Pf stage V gametocyte blood meals containing Pf stage V gametocytes and maintained for 14 days before dissecting and assessing the numbers of PfSPZ in the mosquitoes.

Two batches of first-generation adults were assessed and one batch of adults was allowed to lay eggs from which a second generation of adult mosquitoes was reared and these were also evaluated for PfSPZ infection following blood feeding. The prevalence of infection was 50% and 95% for the two first-generation mosquitoes and 93% for the second-generation batch (Table 2). The numbers of PfSPZ harvested from the infected female mosquitoes in the two batches of first-generation mosquitoes and in the second-generation batch are shown in Table 2. These data demonstrate that the adult mosquitoes: a) retain their capacity to act as vectors of Pf; b) mate and produce eggs; and c) produce offspring that are also competent Pf vectors.

Susceptibility to *Plasmodium falciparum* Infection:

TABLE 2

Infectivity of cryopreserved offspring by *P. falciparum* sporozoites (PfSPZ). Females were membrane-fed on cultures containing stage V Pf gametocytes. Dissections were performed on day 14 post feeding.

|  | 1st Generation | 1st Generation | 2nd Generation |
|---|---|---|---|
| Mosquitoes dissected | 6 | 20 | 30 |
| Prevalence of infection | 50% | 95% | 93% |
| Intensity of infection (PfSPZ/mosquito) | 30,833 | 178,450 | 57,835 |
| Number of PfSPZ per infected mosquito | 61,667 | 187,842 | 62,188 |
| Range of PfSPZ per infected mosquito | 49,000-78,000 | 80,000-332,000 | 250-276,500 |

Figure 7:
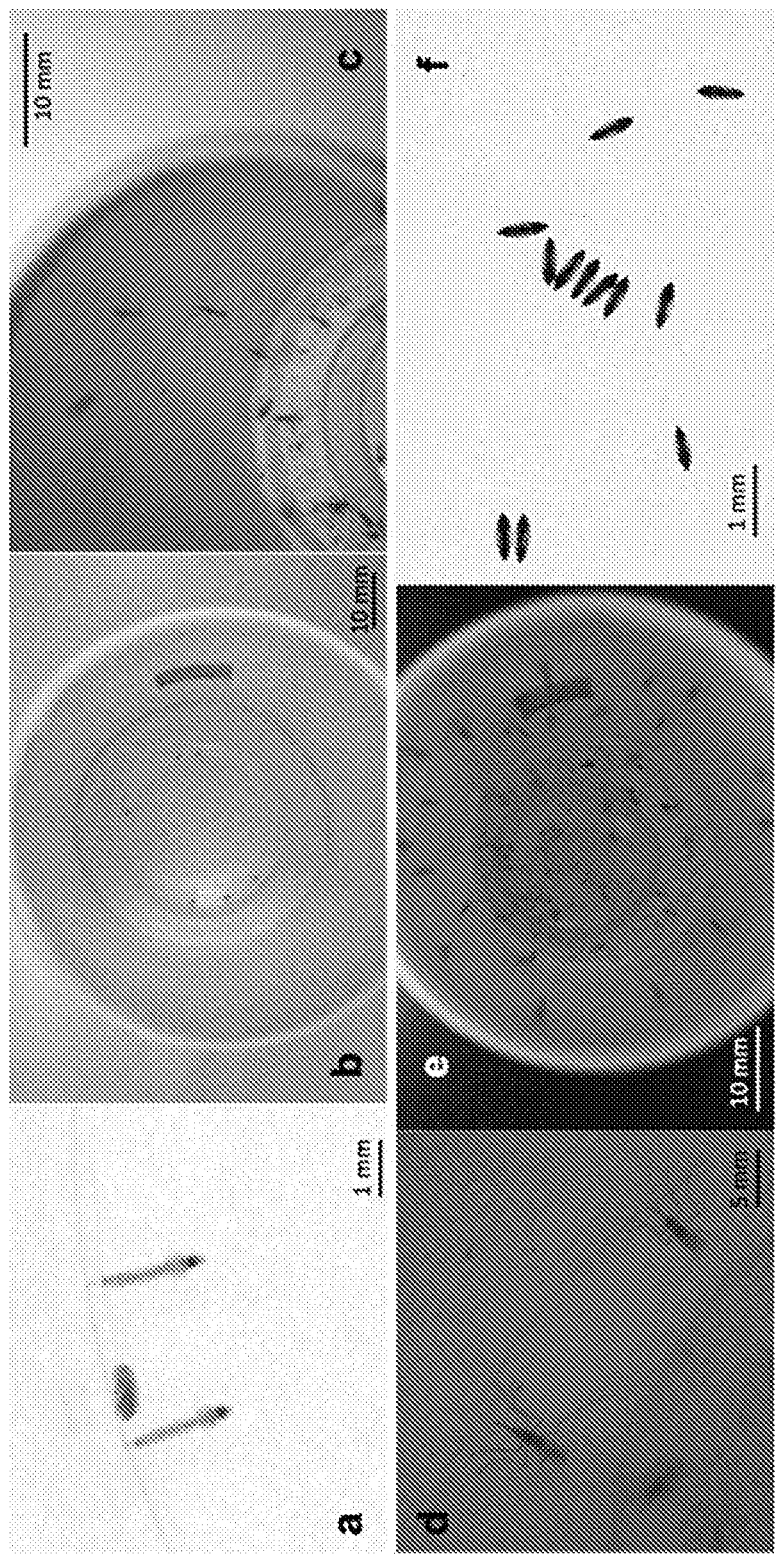
FIG. 7 shows the development of adult *An. stephensi* from cryopreserved embryos and their reproductive competency. Panel A shows larvae and pupae developed from cryopreserved embryos. Panel B shows pupae from cryopreserved embryos in Petri dish in the base of an adult container. Panels C and D show adults that have developed from cryopreserved embryos. Panel E shows eggs (in Petri dish below adults) laid by adults from cryopreserved embryos. Panel F shows eggs laid by adults from cryopreserved embryos.
Figure 8:
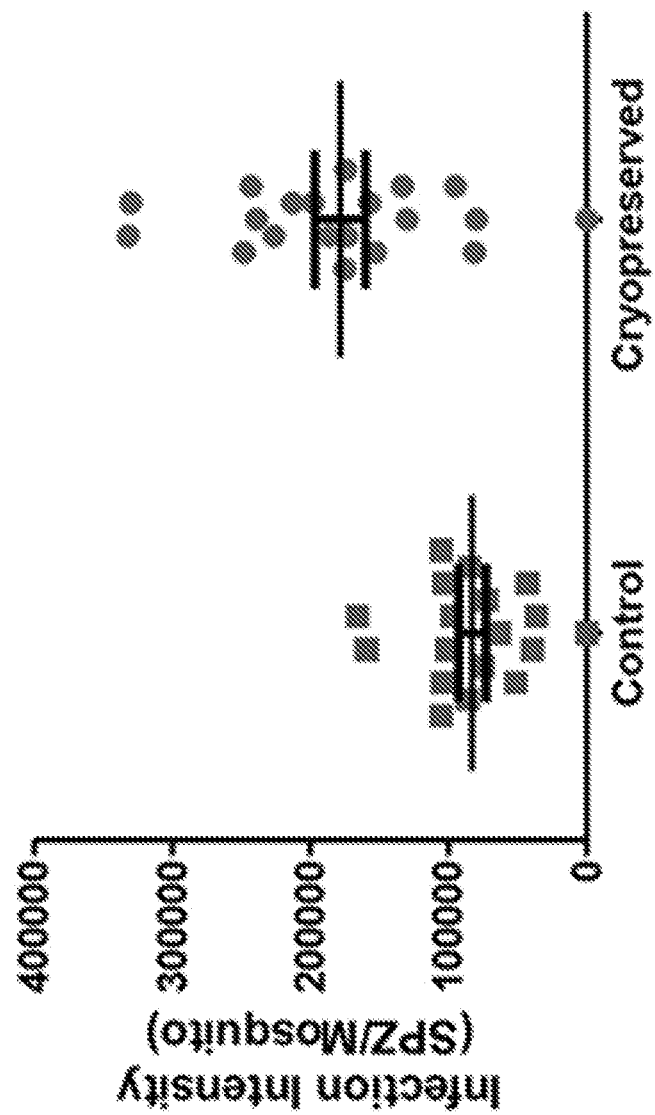
FIG. 8 shows infection rates with *Plasmodium* in mosquitoes derived from cryopreserved eggs. The individual and mean infection intensities of PfSPZ/mosquito obtained from the salivary glands dissected from mosquitoes that had been cryopreserved and thawed (mean: 178,450±18,252) compared to the numbers of PfSPZ/mosquito recovered from control mosquitoes that had not been cryopreserved (mean: 83,083±9,780). The blood meals were identical, prepared from the same stage V gametocyte cell culture.

The development of a method to cryopreserve mosquito embryos has been elusive until now. Disclosed herein is a method that reproducibly yields >25% hatched first instar larvae of *Anopheles* spp. mosquitoes from cryopreserved eggs. The majority of hatched larvae (FIG. 7, Panel a) continue to develop normally (87%), through to adults (98% of pupae) (FIG. 7, Panels b-d) which subsequently blood feed and produce viable second generation embryos that also develop normally (FIG. 7, Panels e and f). Adult mosquitoes obtained from cryopreserved embryos are able to be infected with Pf gametocytes and produce salivary gland sporozoites in similar numbers to control mosquitoes. Critical components of the technique are the time of harvesting the eggs after laying (15-30 minutes) onto water, the use of methanol or D4-methanol as the CPA at high concentration (100% v/v is optimal), the temperature and duration of exposure to the cryoprotectant before cooling (approximately −7° C. for 6.5 minutes followed by −14.5° C. for ~15 minutes), and rapid cooling into chilled −202° C. to −210° C. liquid nitrogen (at ~20,000° C. min$^{-1}$). No pretreatment to permeabilize the egg shell is required, however, surface water is removed before adding the eggs to the CPA. This methodology can easily cryopreserve single batches of >20,000 eggs, adequate for banking species and strains, and to date has been used to bank *An. stephensi* strains including several transgenic lines, and *An. gambiae*.

REFERENCES

Anderson S A, Hulston D A, McVeagh S M, Webb V L, Smith P J, In vitro culture and cryopreservation of *Uronema marinum* isolated from farmed New Zealand groper (Polyprion oxygeneios). J. Microbiol. Methods 79 (2009) 62-66.

Annonymous, worldwideweb.escholar.manchester.ac.uk/api/datastream?publicationPid=uk-ac-man-scw:193478&datastreamId=SUPPLEMENTARY-1.PDF Supporting Information for "Quantitative Interpretation of Diffusion-Ordered NMR Spectra: Can We Rationalise Small Molecule Diffusion Coefficients?" 2012, rev November 2013

Bale, J. S., Insects and low temperatures: from molecular biology to distributions and abundance. Philosophical Transactions of the Royal Society of London Series B: Biological Sciences 2002. 357(1423): p. 849-862.

Briegel, H., Metabolic relationship between female body size, reserves, and fecundity of *Aedes aegypti*. Journal of Insect Physiology, 1990. 36: p. 165-172.

Charlwood, J. D., R. Vij, and P. F. Billingsley, Dry season refugia of malaria-transmitting mosquitoes in a dry savannah zone of east Africa. American Journal of Tropical Medicine and Hygiene, 2000. 62(6): p. 726-32.

Christensen, B. M., et al., Melanization immune responses in mosquito vectors. Trends in Parasitology, 2005. 21(4): p. 192-199.

Church, L. W., et al., Clinical manifestations of *Plasmodium falciparum* malaria experimentally induced by mosquito challenge. Journal of Infectious Diseases, 1997. 175(4): p. 915-20.

Clements, A. N., The Biology of Mosquitoes: Volume 1: Development, Nutrition and Reproduction. 1992, London: Chapman & Hall.

Epstein, J. E., et al., Safety and clinical outcome of experimental challenge of human volunteers with *Plasmodium falciparum*-infected mosquitoes: an update. Journal of Infectious Diseases, 2007. 196(1): p. 145-54.

Farnesi L C, Menna-Barreto R F, Martins A J, Valle D, Rezende G L. Physical features and chitin content of eggs from the mosquito vectors *Aedes aegypti*, *Anopheles aquasalis* and *Culex quinquefasciatus*: Connection with distinct levels of resistance to desiccation. J Insect Physiol. 2015 December; 83:43-52

Feldmann A M, Ponnudurai T, Selection of *Anopheles Stephensi* for refractoriness and susceptibility to *Plasmodium falciparum*. Medical and Veterinary Entomology 3(1):41-52 1989

Goltsev Y[1], Rezende G L, Vranizan K, Lanzaro G, Valle D, Levine M. Development and evolutionary basis for drought tolerance of the *Anopheles gambiae* embryo. Dev Biol. 2009 Jun. 15; 330(2):462-70.

Hoffman, S. L. et al. Protection of Humans against Malaria by Immunization with Radiation-Attenuated *Plasmodium falciparum* Sporozoites J. Inf. Dis. 2002 185:1155-64

Hoffman, S. L. et al. Development of a metabolically active, non-replicating sporozoite vaccine to prevent *Plasmodium falciparum* malaria Human Vaccine 2010 6:1-10

James, E R., Cryopreservation of *Schistosoma mansoni* schistosomula using 40% v/v (10M) methanol and rapid cooling. Cryo-Letters, 1980. 1: p. 535-544

James, E. R., Parasite cryopreservation by vitrification. Cryobiology, 2004. 49: p. 201-210.

James E R, Farrant J, Recovery of infective *Schistosoma mansoni* schistosomula from liquid nitrogen: A step towards a live vaccine against schistosomiatis. Trans Roy Soc Trop Med Hyg 71: 498-500, 1977.

Juliano, S. A., et al., Desiccation and thermal tolerance of eggs and the coexistence of competing mosquitoes. Oecologia, 2002. 130(3): p. 458-469.

Kandul N P, Liu J, Sanchez C H, Wu S L, Marshall J M, and Akbari O S. Transforming insect population control with precision guided sterile males with demonstration in flies. Nat Commun 10: 84, 2019.

Liu, X. H., H. Pan, and P. Mazur, Permeation and toxicity of ethylene glycol and methanol in larvae of *Anopheles gambiae*. Journal of Experimental Biology, 2003. 206: p. 2221-2228.

Liu, X. H. and P. Mazur, Effects of sugars on the kinetics of drying and on the survival of partially dehydrated larvae of *Anopheles* mosquitoes. Journal of Insect Physiology, 2003. 49(7): p. 685-695.

Mazur, P., et al., Cryobiological preservation of *Drosophila* embryos. Science, 1992. 248: p. 1932-1935.

Minakawa, N., et al., Anopheline mosquito survival strategies during the dry period in Western Kenya. Journal of Medical Entomology, 2001. 38(3): p. 388-392.

Monnerat A T, Machado M P, Vale B S, Soares M J, Lima J B P, Lenzi H L, Valle D, *Anopheles albitarsis* embryogenesis: Morphological identification of major events. Mem Inst Oswaldo Cruz, Rio de Janeiro, 97: 589-96, 2002

Nash A, Urdaneta G M, Beaghton A K, Hoermann A, Papathanos P A, Christophides G K, and Windbichler N. Integral gene drives for population replacement. Biol Open 8, 2019.

Rall W F, Wood M J. High in vitro and in vivo survival of day 3 mouse embryos vitrified or frozen in a non-toxic solution of glycerol and albumin. J Reprod Fertil. 1994 August; 101(3):681-8

Rinehart, J. P., R. M. Robich, and D. L. Denlinger, Enhanced cold and desiccation tolerance in diapausing adults of *Culex pipiens*, and a role for Hsp70 in response to cold shock but not as a component of the diapause program. Journal of Medical Entomology, 2006. 43(4): p. 713-722.

Schreuders, P. D., et al., Characterization of intraembryonic freezing in *Anopheles gambiae* embryos. Cryobiology, 1996. 33(5): p. 487-501.

Seki S, Mazur P. The dominance of warming rate over cooling rate in the survival of mouse oocytes subjected to a vitrification procedure. Cryobiology. 2009 August; 59(1):75-82

Shililu, J. I., et al., Development and survival of *Anopheles gambiae* eggs in drying soil: influence of the rate of drying, egg age, and soil type. Journal of the American Mosquito Control Association, 2004. 20(3): p. 243-247.

Smith B S, Hodgson-Smith A, Popiel I, Minter D M, James E R, Cryopreservation of the entomogenous nematode parasite Steinernema feltiae (=Neoaplectana carpocapsae). Cryobiol 27: 319-27, 1990

Steponkus, P. L., et al., Cryopreservation of *Drosophila melanogaster* embryos. Nature, 1990. 345: p. 170-172.

Valencia, M. P., L. H. Miller, and P. Mazur, Permeability of intact and dechorionated eggs of the *Anopheles* mosquito to water vapor and liquid water: a comparison with *Drosophila*. Cryobiology, 1996. 33: p. 142-148.

Valencia, M. P., L. H. Miller, and P. Mazur, Permeabilization of eggs of the malaria mosquito *Anopheles gambiae*. Cryobiology, 1996. 33: p. 149-162.

Wood M J, Sjöblom P, Lindenberg S, Kimber S J. Effect of slow and ultra-rapid freezing on cell surface antigens of 8-cell mouse embryos. J Exp Zool. 1992 Jun. 1; 262(3): 330-9.

EXAMPLES

Example 1—Hatch Rates of *an. Stephensi* Eggs after Collection at Different Times Post-Oviposition Experiments were designed to demonstrate the continued ability to replicate the successful cryopreservation of *An. stephensi* embryos and test the ability of the hatched larvae to develop through to reproductively competent adult mosquitoes. Eggs were collected and cryopreserved at three different times after oviposition (Table 3). Between 2.2% and 75% of eggs hatched to Stage 1 larvae on Day 3 post-thawing. This represents a slight developmental delay relative to untreated eggs whose larval development peaked 2 days after oviposition.

Example 2—Developmental Growth Rate of Larvae from Cryopreserved Eggs

The 38 larvae described in Example 1, collected from cryopreserved *An. stephensi* eggs, were transferred into tap water containing Liquifry™ fish food. The larvae were grown at 27-28° C. in a 12:12 h L:D cycle. As the larvae grew, Liquifry™ was replaced with a diet of Tetramin™ fish food. Late stage larvae were transferred to a 100 mm Petri dish on Day 9 post-thawing and $4^{th}$ instar larvae were present by Day 10 post-thawing. The first pupa was collected on Day 12 post-thawing and transferred to a small dish of water in a 1 pint container. The first adult (male) emerged on Day 14 post-thawing. Pupae were collected through Day 17 post-thawing and adults emerged through Day 19 post-thawing. The kinetics of larvae-to-pupae growth and development were slower than observed under ideal insectary rearing conditions for this strain of *An. stephensi*, but the morphology and behavior of larvae, pupae and adults appeared entirely normal. Thirty three pooled adults (13 females, 20 males), representing a larva to pupal conversion rate of 87%, were maintained at 27-28° C., 75% RH in a 12:12 h L:D, and fed water and sugar ad libitum. There is a slight lag in the rate of growth and development of cryopreserved *An. stephensi* eggs as compared to normal control mosquitoes as shown in Table 4.

TABLE 4

Summary of timing of stages of growth and development of cryopreserved *An. stephensi* vs control mosquitoes.

| | Time (days) | |
|---|---|---|
| | Control embryos | Cryopreserved embryos |
| Egg collection | 0 | 0 |
| Egg cryopreservation and thawing | NA | 0 |
| Egg post-treatment to hatching | NA | 0-3 |
| 1$^{st}$ instar appearance | 2 | 3 |
| Larvae development | 2-10 | 3-16 |
| Pupae collection | 9-11 | 12-17 |
| Adult mosquito emergence | 11-13 | 14-19 |

The adult mosquitoes were maintained as described above until on Day 21 post-thawing the females were fed a meal of human blood through an artificial membrane. All females engorged fully. On Day 25 post-thawing, water for oviposition was provided on the bottom of the maintenance cage; females began ovipositing 6 h later and continued for approximately 18 h. The $G_0$ adult mosquitoes were subsequently maintained until Day 54 post-thawing, at which time there were eight surviving females (62%) and one surviving male (5%).

Example 3 —*P. falciparum* Infection and Sporozoite Development in Progeny of Cryopreserved Mosquito Eggs One day after oviposition, eggs were aspirated from the cage and transferred to a plastic pan containing tap water and Liquifry™ fish food. $G_1$ larvae were grown as described above and pupae formed within 11 days. A total of 43 pupae were collected and transferred to a 1 pint container. Adults emerged within 17 days from 42 of 43 pupae. Adult mosquitoes were aspirated to a 1 gallon mosquito cage and females fed through an artificial membrane on a blood meal containing *Plasmodium falciparum* NF54 stage V gametocytes. An estimated 95% of the females became fully engorged with infective blood. Infected mosquitoes were maintained at 26° C., 77% RH, 12:12 h L:D cycle and fed water and sugar ad libitum. Fifteen days after the infectious feed, mosquitoes were dissected and *P. falciparum* sporozoites were observed in the salivary glands at equivalent intensities to those in control mosquitoes reared by conventional methods.

What is claimed is:

1. A composition comprising a plurality of cryopreserved anopheline eggs and a cryoprotectant additive (CPA) at a concentration of 50% to 100% v/v, wherein the CPA is an isotopic variant of methanol, an isotopic variant of ethylene glycol, or a combination thereof.

2. The composition of claim 1, wherein the CPA is at a concentration of 99% to 100% v/v.

3. The composition of claim 1, wherein the CPA is H4-methanol or D4-methanol.

4. The composition of claim 1, wherein the plurality of cryopreserved anopheline eggs are cryopreserved and stored at or below −20° C.

5. The composition of claim 4, wherein the plurality of cryopreserved anopheline eggs are cryopreserved below −135° C.

6. The composition of claim 1, wherein at least 10% of said plurality of cryopreserved anopheline eggs hatch and release viable first instar larvae after said plurality of cryopreserved anopheline eggs are thawed, diluted and incubated.

7. The composition of claim 1, wherein at least 25% of said plurality of cryopreserved anopheline eggs hatch and release viable first instar larvae after said plurality of cryopreserved anopheline eggs are thawed, diluted and incubated.

8. The composition of claim 1, wherein the species of said plurality of anopheline eggs is an *Anopheles* species that is susceptible to a *Plasmodium* species infection.

9. The plurality of cryopreserved anopheline eggs of claim 7, wherein the anopheline eggs are cryopreserved below Tg (the glass transition temperature or −135° C.).

10. An adult-stage mosquito developed from the viable first instar larvae of claim 6.

11. The adult-stage mosquito of claim 10, which is infected with *Plasmodium*-species parasites, wherein said *Plasmodium*-species parasites develop to the sporozoite stage.

12. The adult-stage mosquito of claim 10, which oviposit viable progeny.

13. A method for the cryopreservation of a viable anopheline egg comprising:
    (a) a first incubation of the anopheline egg in a solution comprising 50% to 100% v/v methanol at a temperature between 0° C. and −15° C. for between 1-120 minutes;
    (b) a second incubation of said anopheline egg at a temperature between −5° C. and −20° C. for 5-120 minutes;
    (c) a first transfer of said anopheline egg to liquid nitrogen; and
    (d) a second transfer of said anopheline egg to a cryopreserved storage at a temperature equal to or less than −135° C.

14. The method of claim 13, wherein the temperature of the first incubation period is between −5° C. and −11° C., and wherein the duration of the first incubation period is between 5 and 60 minutes.

15. The method of claim 13, wherein the temperature of the second incubation period is between −5° C. and −20° C., and wherein the duration of the second incubation period is between 5 and 20 minutes.

16. The method of claim 13, wherein anopheline eggs are harvested at between 5 minutes and 120 minutes post-oviposition.

17. The method of claim 13, wherein subsequent to the cryopreserved storage of (d), the anopheline egg is warmed at a rate of at least 1,000° C./min and diluted with a CPA at a dilution of at least 1:10.

18. The composition of claim 1, wherein the CPA is at a concentration of 70% to 100% v/v.

19. A method for the cryopreservation of a viable anopheline egg comprising:
    (a) a first incubation of the anopheline egg in a solution comprising 99.5% to 100% v/v methanol at a temperature between −5° C. and −7° C. for between 5-8 minutes;
    (b) a second incubation of said anopheline egg at a temperature of −10° C. to −15° C. for 10-20 minutes;
    (c) a first transfer of said anopheline egg to liquid nitrogen; and
    (d) a second transfer of said anopheline egg to a cryopreserved storage at a temperature equal to or less than −135° C.

20. The method of claim 17, wherein subsequent to the warming and dilution, a plurality anopheline eggs are incubated and hatched to release viable first instar larvae.

21. The method of claim 17, wherein the viable hatched anopheline eggs develop into adult-stage mosquitoes.

22. The method of claim 21, wherein the adult-stage mosquitoes are infected with *Plasmodium*-species parasites, wherein said *Plasmodium*-species parasites develop to the sporozoite stage.

23. The method of claim 21, wherein the adult-stage mosquitoes oviposit viable progeny.

* * * * *